US012464303B2

(12) United States Patent
Schneider et al.

(10) Patent No.: US 12,464,303 B2
(45) Date of Patent: Nov. 4, 2025

(54) APPARATUS AND METHOD FOR PROVIDING INDIVIDUAL SOUND ZONES

(71) Applicant: Fraunhofer-Gesellschaft zur Förderung der angewandten Forschung e.V., Munich (DE)

(72) Inventors: Martin Schneider, Erlangen (DE); Stefan Wetzel, Bubenreuth (DE); Andreas Walther, Feucht (DE); Christian Uhle, Ursensollen (DE); Oliver Hellmuth, Buckenhof (DE); Peter Prokein, Erlangen (DE); Emanuel Habets, Spardorf (DE)

(73) Assignee: FRAUNHOFER-GESELLSCHAFT ZUR FÖRDERUNG DER ANGEWANDTEN FORSCHUNG E.V., Munich (DE)

( * ) Notice: Subject to any disclaimer, the term of this patent is extended or adjusted under 35 U.S.C. 154(b) by 0 days.

(21) Appl. No.: 16/157,827

(22) Filed: Oct. 11, 2018

(65) Prior Publication Data

US 2019/0045316 A1 Feb. 7, 2019

Related U.S. Application Data

(63) Continuation of application No. PCT/EP2017/058611, filed on Apr. 11, 2017.

(30) Foreign Application Priority Data

Apr. 12, 2016 (EP) .................................... 16164984

(51) Int. Cl.

*H04S 7/00* (2006.01)
*H04S 3/00* (2006.01)

(52) U.S. Cl.

CPC ................ *H04S 7/30* (2013.01); *H04S 3/008* (2013.01); *H04R 2499/13* (2013.01);

(Continued)

(58) Field of Classification Search

CPC ........ H04S 7/30; H04S 3/008; H04S 2400/15; H04S 2400/13; H04S 2420/11; H04S 2420/13; H04R 2499/13

See application file for complete search history.

(56) References Cited

U.S. PATENT DOCUMENTS 4,944,018 A 7/1990 Bose et al.
4,977,600 A 12/1990 Ziegler (Continued)

FOREIGN PATENT DOCUMENTS

CN 103188587 A 7/2013
CN 104170408 A 11/2014

(Continued)

OTHER PUBLICATIONS

International Search Report and Written Opinion issued in application No. PCT/EP2017/058611 on May 17, 2017.

(Continued)

*Primary Examiner* — Ping Lee
(74) *Attorney, Agent, or Firm* — McClure, Qualey & Rodack, LLP

(57) ABSTRACT

An apparatus for generating a plurality of loudspeaker signals from two or more audio source signals is provided. Each of the two or more audio source signals shall be reproduced in one or more of two or more sound zones, and at least one of the two or more audio source signals shall not be reproduced in at least one of the two more sound zones. An audio preprocessor is configured to modify each initial audio signal of the two or more initial audio signals depending on a signal power or a loudness of another initial audio (Continued)

signal of the two or more initial audio signals. A filter is configured to generate the plurality of loudspeaker signals depending on in which of the two or more sound zones the two or more audio source signals shall be reproduced and depending on in which of the two or more sound zones the two or more audio source signals shall not be reproduced.

15 Claims, 11 Drawing Sheets

(52) U.S. Cl.
CPC ....... *H04S 2400/13* (2013.01); *H04S 2400/15* (2013.01); *H04S 2420/11* (2013.01); *H04S 2420/13* (2013.01)

(56) References Cited

U.S. PATENT DOCUMENTS

| | | | |
|---|---|---|---|
| 5,018,205 | A | 5/1991 | Takagi et al. |
| 5,081,682 | A | 1/1992 | Kato et al. |
| 5,416,846 | A | 5/1995 | Tamura et al. |
| 5,434,922 | A | 7/1995 | Miller et al. |
| 5,550,922 | A | 8/1996 | Becker |
| 5,809,153 | A | 9/1998 | Aylward et al. |
| 5,870,484 | A | 2/1999 | Greenberger |
| 6,078,670 | A | 6/2000 | Beyer |
| 6,674,865 | B1 | 1/2004 | Venkatesh et al. |
| 7,440,578 | B2 | 10/2008 | Arai et al. |
| 8,190,438 | B1 | 5/2012 | Nelissen |
| 8,787,595 | B2 | 7/2014 | Urata |
| 2003/0103636 | A1 | 6/2003 | Arai et al. |
| 2003/0142842 | A1 | 7/2003 | Arai et al. |
| 2004/0105550 | A1 | 6/2004 | Aylward et al. |
| 2005/0069148 | A1 | 3/2005 | Nishikawa et al. |
| 2005/0135635 | A1 | 6/2005 | Prince |
| 2005/0152562 | A1 | 7/2005 | Holmi et al. |
| 2005/0190935 | A1 | 9/2005 | Sakamoto |
| 2006/0034467 | A1 | 2/2006 | Sleboda et al. |
| 2006/0034470 | A1 | 2/2006 | Bongiovi |
| 2006/0262935 | A1 | 11/2006 | Goose et al. |
| 2007/0030976 | A1 | 2/2007 | Konagai |
| 2007/0053532 | A1 | 3/2007 | Elliott et al. |
| 2007/0274546 | A1 | 11/2007 | Hirayama |
| 2007/0286426 | A1 | 12/2007 | Xiang et al. |
| 2008/0071400 | A1 | 3/2008 | Haulick et al. |
| 2008/0103615 | A1 | 5/2008 | Walsh et al. |
| 2008/0130922 | A1 | 6/2008 | Shibata et al. |
| 2008/0273712 | A1 | 11/2008 | Eichfeld et al. |
| 2008/0273713 | A1 | 11/2008 | Hartung et al. |
| 2009/0232320 | A1 | 9/2009 | Azizi et al. |
| 2010/0046765 | A1 | 2/2010 | De Bruijn et al. |
| 2010/0226499 | A1 * | 9/2010 | De Bruijn ............... H04S 7/303 381/17 |
| 2010/0239727 | A1 | 9/2010 | Taylor |
| 2010/0329488 | A1 | 12/2010 | Holub |
| 2011/0222695 | A1 | 9/2011 | Hess et al. |
| 2011/0286614 | A1 | 11/2011 | Hess |
| 2012/0140945 | A1 | 6/2012 | Harris |
| 2013/0170668 | A1 | 7/2013 | Hess et al. |
| 2013/0230175 | A1 | 9/2013 | Bech et al. |
| 2013/0272526 | A1 | 10/2013 | Walther et al. |
| 2014/0056431 | A1 | 2/2014 | Kano |
| 2014/0064526 | A1 | 3/2014 | Otto et al. |
| 2014/0314256 | A1 | 10/2014 | Fincham et al. |
| 2015/0043736 | A1 | 2/2015 | Olsen et al. |
| 2015/0256933 | A1 | 9/2015 | Vautin et al. |
| 2015/0350805 | A1 | 12/2015 | Markus |

FOREIGN PATENT DOCUMENTS

| | | | |
|---|---|---|---|
| CN | 104980845 | A | 10/2015 |
| DE | 3045722 | A1 | 6/1982 |
| DE | 9015454 | U1 | 3/1991 |
| DE | 10052104 | A1 | 5/2002 |
| DE | 10242558 | A1 | 4/2004 |
| DE | 10351145 | A1 | 6/2005 |
| DE | 102010040689 | A1 | 3/2012 |
| DE | 102014210105 | A1 | 12/2015 |
| EP | 2450880 | A1 | 5/2012 |
| JP | 861112496 | A | 5/1986 |
| JP | 2001095082 | A | 4/2001 |
| JP | 2003255954 | | 9/2003 |
| JP | 2004363696 | A | 12/2004 |
| JP | 2010109579 | A | 5/2010 |
| JP | 2013141235 | A | 7/2013 |
| JP | 5345549 | B2 | 8/2013 |
| KR | 20140138907 | A | 12/2014 |
| RU | 2555237 | C2 | 7/2015 |
| WO | 2004114725 | A1 | 12/2004 |
| WO | 2007098916 | A1 | 9/2007 |
| WO | 2010044439 | A1 | 4/2010 |

OTHER PUBLICATIONS

International Preliminary Examination Report issued in issued in application No. PCT/EP2017/058611 on Jul. 11, 2018.

Wikipedia: "Angular resolution", https://en.wikipedia.org/wiki/Angular_resolution, retrieved from the internet on Apr. 8, 2016.

Wikipedia: "Nyquist-Shannon sampling theorem", hhttps://en.wikipedia.org/wiki/Nyquist-Shannon_sampling_theorem, retrieved from the internet on Apr. 8, 2016.

Wikipedia: "Dynamic range compression", https://en.wikipedia.org/wiki/Dynamic_range_compression, retrieved from the internet on Apr. 8, 2016.

Wikipedia: "Weighting filter", https://en.wikipedia.org/wiki/Weighting_filter, retrieved from the internet on Apr. 8, 2016.

Wikipedia: "Audio crossover—Digital", https://en.wikipedia.org/wiki/Audio_crossover#Digital, retrieved from the internet on Apr. 8, 2016.

Schneider, Martin; Kellermann, Walter: "Iterative DFT-domain inverse filter determination for adaptive listening room equalization", In: Acoustic Signal Enhancement; Proceedings of IWAENC 2012; International Workshop on. VDE, 2012, S. 1-4.

W. Druyvesteyn and J. Garas, "Personal sound," Journal of the Audio Engineering Society. vol. 45, No. 9, pp. 685-701, 1997.

F. Dowla and A. Spiridon, "Spotforming with an array of ultra-wideband radio transmitters," in Ultra Wideband Systems and Technologies, 2003 IEEE Conference on, Nov. 2003, pp. 172-175.

J.-W. Choi and Y.-H. Kim, "Generation of an acoustically bright zone with an illuminated region using multiple sources," Journal of the Acoustical Society of America, vol. 111, No. 4, pp. 1695-1700, 2002.

M. Poletti, "An investigation of 2-d multizone surround sound systems," in Audio Engineering Society Convention 125, Oct. 2008. [Online]. Available: http://www.aes.org/e-lib/browse.cfm?elib=14703.

Y. Wu and T. Abhayapala, "Spatial multizone soundfield reproduction," in Acoustics, Speech and Signal Processing, 2009. ICASSP 2009. IEEE International Conference on, Apr. 2009, pp. 93-96.

Y. J. Wu and T. D. Abhayapala, "Spatial multizone soundfield reproduction: Theory and design," Audio, Speech, and Language Processing, IEEE Transactions on, vol. 19, No. 6. pp. 1711-1720, 2011.

D. Brandwood, "A complex gradient operator and its application in adaptive array theory," Microwaves, Optics and Antennas, IEE Proceedings H. vol. 130. No. 1. pp. 11-16. Feb. 1983.

Russian Office Action, The Federal Institute for Industrial Property of the Federal Service for Intellectual Property, Patents and Trade Marks, Issued on Apr. 11, 2017, Application No. 2018139487, pp. 1-10.

Japanese Office Action dated Jan. 8, 2020, issued in application No. 2018-553932 pp. 6-10.

English Language of Japanese Office Action dated Jan. 8, 2020, issued in application No. 2018-553932 pp. 1-5.

Korean Office Action (Decision to Grant) dated Jun. 29, 2020, issued in patent application No. 10-2018-7032105.

(56) References Cited

OTHER PUBLICATIONS

English language translation of Korean Office Action (Decision to Grant) dated Jun. 29, 2020, issued in patent application No. 10-2018-7032105.
Indian language office action dated Mar. 27, 2023, issued in application No. IN 201837038419.
European Office Action patent application No. 17715755.9, dated Aug. 21, 2020.
Office Action mailed in Chinese patent application No. 201780036537.5, mailed Apr. 28, 2020.
Japanese Office Action patent application No. 2018-553932 , dated Dec. 24, 2020.
English Translation of Japanese Office Action patent application No. 2018-553932 , dated Dec. 24, 2020.
English language translation of Chinese Office Action dated Apr. 28, 2020, issued in application No. 201780036537.5.

* cited by examiner

APPARATUS AND METHOD FOR PROVIDING INDIVIDUAL SOUND ZONES

CROSS-REFERENCE TO RELATED APPLICATIONS

This application is a continuation of copending International Application No. PCT/EP2017/058611, filed Apr. 11, 2017, which is incorporated herein by reference in its entirety, and additionally claims priority from European Application No, EP 16 164 984.3, filed Apr. 12, 2016 which is incorporated herein by reference in its entirety.

The present invention relates to audio signal processing and, in particular, to an apparatus and method for providing individual sound zones.

BACKGROUND OF THE INVENTION

Reproducing different acoustic scenes in multiple sound zones located nearby without acoustic barriers in between is a well-known task in audio signal processing, which is often referred to as multizone reproduction (see [1]). From the technical point of view, multizone reproduction is closely related to loudspeaker beamforming or spotforming (see [2]) when nearfield scenarios are considered, where the loudspeaker array aperture may also enclose the listener.

A problem in a multizone reproduction scenario may, for example, be to provide substantially different acoustic scenes (e.g. different pieces of music or audio content of different movies) to the listeners occupying individual sound zones.

A simplified ideal example of multizone reproduction is shown in FIG. 2, where the two zones 221, 222 receive the signals $u_1(k)$ and $u_2(k)$ of two signal sources 211, 212, respectively, without interference of the other source and k being the time instant. It should be noted that this scenario is only a placeholder for more complex scenarios, where multichannel audio is provided to an arbitrary number of zones. However, the simple example shown in FIG. 2 is sufficient for the explanations in the following.

When reproducing multiple signals in a real-world enclosure, a perfect separation is impossible since acoustic waves cannot be stopped without an acoustic barrier. Hence, there will be a cross-talk between the individual sound zones, which are occupied by individual listeners.

FIG. 3 illustrates a reproduction of multiple signals in reality. The signals reproduced in the individual sound zones 221, 222, namely $y_1(k)$ and $y_2(k)$, are obtained by convolving the source signals $u_1(k)$ and $u_2(k)$ from the signal sources 211, 212 with the respective impulse responses $h_{1,1}(k)$, $h_{2,2}(k)$, $h_{1,2}(k)$, and $h_{2,1}(k)$ of the LEMS (loudspeaker-enclosure-microphone system) according to $$y_1(k)=y_{1,1}(k)+y_{1,2}(k)=u_1(k)*h_{1,1}(k)+u_2(k)*h_{1,2}(k), \quad (1)$$

$$y_2(k)=y_{2,2}(k)+y_{2,1}(k)=u_2(k)*h_{2,2}(k)+u_2(k)*h_{2,1}(k), \quad (2)$$

where * denotes the convolution, as defined by $$u_1(k)*h_{1,1}(k)=\sum_{n=-\infty}^{\infty} u_1(k)h_{1,1}(k-n). \quad (3)$$

Here, $y_{1,2}(k)$ and $y_{2,1}(k)$ are considered to be unwanted interfering signal components, in contrast to the desired components $y_{1,1}(k)$ and $y_{2,2}(k)$. When $u_1(k)$ and $u_2(k)$ describe entirely different acoustic scenes, only a very small contribution of $u_2(k)$ in $y_1(k)$ compared to the contribution of $u_1(k)$ in $y_1(k)$ is acceptable. The same holds for $y_2(k)$ with reversed indices.

A straightforward way to achieve this is to design the loudspeaker setup such that $h_{1,1}(k)$ and $h_{2,2}(k)$ exhibit a higher energy, compared to $h_{1,2}(k)$ and $h_{2,1}(k)$, which describe cross-zone reproduction. One example for this would be to use loudspeakers located nearby the listeners (US 2003103636, US 2003142842), where using headphones can be seen as an extreme case of such a setup. However, placing loudspeakers too close to the listeners is often unacceptable, because this can interfere with the listener's movement, such that this approach is limited in practical applications.

An approach to overcome this, is to use directional loudspeakers, where the loudspeaker directivity is typically higher for higher frequencies (see [35]: JP 5345549, and [21]: US 2005/0190935 A1). Unfortunately, this approach is only suitable for higher frequencies (see [1]).

Another approach is to utilize a loudspeaker array in conjunction with suitable prefilters for a personalized audio reproduction.

FIG. 4 illustrates a minimal example of multizone reproduction with arrays. In particular, FIG. 4 illustrates a rudimentary setup with two signal sources 211, 212, two loudspeakers and two zones 221, 222. The example of FIG. 4 is a placeholder for more complex scenarios that occur in real-world applications.

In the example of FIG. 4, the amount of cross-zone reproduction is determined by the cascade of the prefilters G(K) 413, 414 and the impulse responses H(k) 417 and not only by H(k) 417. Thus, $h_{1,2}(k)$ and $h_{2,1}(k)$ do not necessarily have to be small in magnitude in order to achieve a considerable cross-zone attenuation.

FIG. 6 illustrates a general signal model of multizone reproduction with arrays. The signal sources 610, the prefilters 615, the impulse responses 417 and the sound zones 221, 222 are depicted.

It should be noted that multizone reproduction is generally not limited to providing two signals to two zones. In fact, the numbers of sources, loudspeakers and listening zones can be arbitrary. The following explanations and definitions can be used for a general scenario with $N_S$ signal sources, $N_L$ loudspeakers, and $N_M$ considered positions in the $N_Z$ listening zones. In such a scenario, it is possible that multiple signals are reproduced in an individual zone to achieve a spatial sound reproduction. The corresponding signal model is shown in FIG. 6, where "Zone 1" 221 is supplied with the signals $y_1(k)$ and $y_2(k)$. The resulting signal vectors are given by:

$$u(k)=(u_1(k),u_2(k), \ldots ,u_{N_S}(k))^T, \quad (4)$$

$$x(k)=(x_1(k),x_2(k), \ldots ,x_{N_K}(k))^T, \quad (5)$$

$$y(k)=(y_1(k),y_2(k), \ldots ,y_{N_M}(k))^T, \quad (6)$$

$$x(k)=G(k)*u(k), \quad (7)$$

$$y(k)=H(k)*x(k). \quad (8)$$

Here, a representation of Equation (3) is given by $$G(k)*u(k)=\sum_{n=0}^{L_G-1} G(k)u(k-n), \quad (9)$$

assuming that the impulse responses captured in G(k) are limited to be non-zero only for $0 \le k < L_G$.

The matrices G(k) and H(k) describe the prefilter impulse responses and the room impulse responses according to $$G(k) = \begin{pmatrix} g_{1,1}(k) & g_{1,2}(k) & \dots & g_{1,N_S}(k) \\ g_{2,1}(k) & g_{2,2}(k) & \dots & g_{2,N_S}(k) \\ \vdots & \vdots & \ddots & \vdots \\ g_{N_L,1}(k) & g_{N_L,2}(k) & \dots & g_{N_L,N_S}(k) \end{pmatrix}, \quad (10)$$

$$H(k) = \begin{pmatrix} h_{1,1}(k) & h_{1,2}(k) & \dots & h_{1,N_L}(k) \\ h_{2,1}(k) & h_{2,2}(k) & \dots & h_{2,N_L}(k) \\ \vdots & \vdots & \ddots & \vdots \\ h_{N_M,1}(k) & h_{N_M,2}(k) & \dots & h_{N_M,N_L}(k) \end{pmatrix}. \quad (11)$$

For each source signal there are sound zones in which the signal should be reproduced, the so called "bright zones". At the same time, there are zones where the individual signal should not be reproduced, the "dark zones".

For example, in FIG. 3, signal source 211 shall be reproduced in sound zone 221, but not in sound zone 222. Moreover, in FIG. 3, signal source 212 shall be reproduced in sound zone 222, but not in sound zone 221.

For multizone reproduction, the prefilters are typically designed such that the ratio between the acoustic energy radiated into the bright zones and the acoustic energy radiated into the dark zones is maximized. This ratio is often termed acoustic contrast (see [3]) and can be measured by defining $B_q(k)$ and $D_q(k)$, which capture the room impulse responses from each loudspeaker, to the considered sampling points in the bright and dark zones, respectively. Since this assignment is different for every source signal, both matrices are dependent on the source signal index q. Additionally, the matrix G(k) may be decomposed into $$G(k)=g_1(k),g_2(k), \dots ,g_{N_S}(k)), \quad (12)$$

where $$g_q(k)=(g_{1,q}(k),g_{2,q}(k), \dots g_{N_L,q}(k))^T, \quad (13)$$

captures the individual filter coefficients $g_{l,q}(k)$ that are associated with loudspeaker l and source q. Eventually, the acoustic contrast achieved for source q can be defined according to $$C_q = \left. \frac{(g_q^T(-k) * B_q^T(-k)) * (B_q(k) * g_q(k))}{(g_q^T(-k) * D_q^T(-k)) * (D_q(k) * g_q(k))} \right|_{k=0}. \quad (14)$$

An example of the reproduction levels in bright and dark zone with resulting acoustic contrast is shown in FIG. 5. In particular, FIG. 5 illustrates in (a) an exemplary reproduction level in bright and dark zone, and illustrates in (b) a resulting acoustic contrast.

It should be noted that if any impulse response in H(k) is either assigned to the dark zone or to the bright zone for a source, the following holds:

$$H(k)=B_q(A)D_q(k) \forall q,k. \quad (15)$$

There are many methods known to determine G(k) such that $C_q$ achieves a high value (see [1], [3], [4], [5] and [6]).

Difficulties exist, when directional sound reproduction is conducted.

Some of the approaches mentioned above try to achieve multizone reproduction by directional sound radiation. Such an approach faces major physical challenges, which are described below.

When a wave is emitted through a finite-size aperture, the ratio of aperture size to the wavelength determines how good the radiation direction can be controlled. A better control is achieved for smaller wavelength and larger aperture sizes. For the angular resolution of a telescope this is described by the approximation $$\Theta \approx 1.22 \frac{\lambda}{D}, \quad (16)$$

where Θ is the minimum angle between two points that can be distinguished, λ is the wavelength and D the diameter of the telescope, see:

https://en.wikipedia.org/wiki/Angular_resolution (see [63]).

Since acoustic waves obey the same wave equation, this rule is also applicable to acoustic waves. Eventually, technical reasons limit the size of loudspeaker membranes or horn apertures, which implies a lower limit for the frequencies for which directional reproduction is effectively possible. Moreover, the same holds also for loudspeaker arrays, where not the size of the individual loudspeakers is of relevance, but the dimensions of the entire loudspeaker array. Unlike for the drivers of individual loudspeakers, array dimensions are primarily constrained by economical but not by technical reasons.

When using loudspeaker arrays for directional sound reproduction, the minimum inter-loudspeaker distance implies an upper frequency limit. This is because the sampling theorem, see:

https://en.wikipedia.org/wiki/Nyquist-Shannon_sampling_theorem (see [64]).

is also relevant in the spatial domain, where two sampling points per wave length may be used in order to achieve a controlled directional radiation. Placing loudspeakers sufficiently close to control the directional radiation within the audible frequency range is typically not a problem. However, the resulting minimum aperture size (see above) and a minimum inter-loudspeaker distance implies a minimum number of loudspeakers that depends quadratically on the frequency range in which the radiation direction should be controlled. Since the expenses for a loudspeaker array are proportional to the number of loudspeakers, there are effective frequency limits for commercially viable loudspeaker array reproduction solutions.

Furthermore, the enclosure where the multiple sound zones should be created can influence the achieved radiation pattern itself. For higher frequencies, large enclosures, and straight walls, models can be found to analytically consider the enclosure geometry in the design of directional loudspeakers or prefilters for loudspeaker array reproduction. However, this is no longer possible when the enclosure exhibits a (general) curvature, when arbitrarily shaped obstacles are placed in the enclosure, or when the dimensions of the enclosure are in the order of magnitude of the wavelength. Such a setup exists, e.g., in a car cabin and will be referred to as a complex setup in the following. Under such conditions, exciting a controlled sound field by directional loudspeakers or electrically steered arrays is very challenging because of the sound reflected from the enclosure that cannot be exactly modeled. Under such conditions, even non-directional individually driven loudspeakers may effectively exhibit an uncontrolled directional pattern.

Some of the known documents relate to (cross-) signal dependent gain control.

US 200510152562 A1 (see [8]) relates to in-car surround sound reproduction with different operation modes related to different loudness patterns on the individual seats and different equalization patterns.

US 2013/170668 A1 (see [9]) describes mixing an announcement sound to an entertainment signal. The mix between both signals is individual for each of two zones.

US 200810071400 A1 (see [10]) discloses signal processing depending on source or content information considering two different signals to relief the driver from being "acoustically overloaded".

US 2006/0034470 A1 (see [11]) relates to equalization, compression, and "mirror image" equalization to reproduce audio in high-noise conditions with increased quality.

US 2011/0222695 A1 (see [12]) discloses audio compression of subsequently played audio tracks, also with considering the ambient noise and psychoacoustic models.

US 2009/0232320 A1 (see [13]) describes compression to have an announcement sound louder than an entertainment program, with user interaction.

US 2015/0256933 A1 (see [14]) discloses a balance level of telephone and entertainment content to minimize acoustic leakage of content.

U.S. Pat. No. 6,674,865 B1 (see [15]) relates to automatic gain control, for hands-free telephony.

DE 30 45 722 A1 (see [16]) discloses parallel compression to noise level and level increase for announcement.

Other known documents relate to multizone reproduction.

US 2012/0140945 A1 (see [17]) relates to explicit sound zones implementation. High frequencies are reproduced by a loudspeaker, low frequencies use constructive and destructive interference by manipulating amplitude phase and delay. To determine how amplitude, phase, and delay have to be manipulated, [17] proposes to use special techniques, the "Tan Theta"-method or solving an elgenvalue problem.

US 2008/0273713 A1 (see [18]) discloses sound zones, array of speakers located near each seat, wherein a loudspeaker array is explicitly assigned to each of the zones.

US 2004/0105550 A1 (see [19]) relates to sound zones, directional close to head, non-directional away from listener.

US 2006/0262935 A1 (see [20]) relates to personal sound zones explicitly.

US 2005/0190935 A1 (see [21]) relates to headrest or seat back loudspeakers for personalized playback.

US 2008/0130922 A1 (see [22]) discloses sound zones implementation with directional loudspeakers near front seat, non-directional loudspeakers near back seat and signal processing such that front and back cancel to leakage of each other.

US 2010/0329488 A1 (see [23]) describes sound zones in a vehicle with at least one loudspeaker and one microphone associated with each zone.

DE 10 2014 210 105 A1 (see [24]) relates to sound zones realized with binaural reproduction, also using crosstalk-cancellation (between ears), and also to a reduction of cross-talk between zones.

US 2011/0286614 A1 (see [25]) discloses sound zones with binaural reproduction based on crosstalk-cancellation and head tracking.

US 2007/0053532 A1 (see [26]) describes headrest loudspeakers.

US 2013/0230175 A1 (see [27]) relates to sound zones, explicitly using microphones.

WO 2016/008621 A1 (see [28]) discloses a head and torso simulator.

Further known documents relate to directional reproduction.

US 2008/0273712 A1 (see [29]) discloses a directional loudspeaker mounted to a vehicle seat.

U.S. Pat. No. 5,870,484 (see [30]) describes stereo reproduction with directional loudspeakers.

U.S. Pat. No. 5,809,153 (see [31]) relates to three loudspeakers point in three directions with circuitry to use them as arrays.

US 2006/0034467 A1 (see [32]) discloses sound zones that re a e to the excitation of the headliner by special transducers.

US 2003/0103636 A1 (see [33]) relates to a personalized reproduction and silencing and to headrest arrays to produce the sound field at listeners ears including silencing.

US 2003/0142842 A1 (see [34]) relates to headrest loudspeakers.

JP 5345549 (see [5]) describes parametric loudspeakers in front seats pointing back.

US2014/0056431 A1 (see [36]) relates to directional reproduction.

US 2014/0064526 A1 (see [37]) relates to producing a binaural and localized audio signal to a user.

US 2005/0069148 A1 (see [38]) discloses the use of loudspeakers in the headlining with an according delay.

U.S. Pat. No. 5,081,682 (see [39]). DE 90 15 454 (see [40]), U.S. Pat. No. 5,550,922 (see [41]), U.S. Pat. No. 5,434,922 (see [42]), U.S. Pat. No. 6,078,670 (see [43]), U.S. Pat. No. 6,674,865 B1 (see [44]), DE 100 52 104 A1 (see [45]) and US 2005/0135635 A1 (see [46]) relate to gain adaptation or spectral modification of signals according to measured ambient noise or estimated ambient noise, e.g., from speed.

DE102 42 558 A1 (see [47]) discloses to antiparallel volume control.

US 2010/0046765 A1 (see [48]) and DE 10 2010 040 689 (see [49]) relate to an optimized cross-fade between subsequently reproduced acoustic scenes.

US 2008/0103615 A1 (see [50]) describes a variation of panning dependent on an event.

U.S. Pat. No. 8,190,438 B1 (see [51]) describes an adjustment of spatial rendering depending on a signal in an audio stream.

WO 20071098916 A1 (see [52]) describes reproducing a warning sound.

US 2007/0274546 A1 (see [53]) determines which piece of music can be played in combination with another.

US 2007/0286426 A1 (see [54]) describes the mixing of one audio signal (e.g. from a telephone) to another (e.g. music).

Some known documents describe audio compression and gain control.

U.S. Pat. No. 5,018,205 (see [55]) relates to band-selective adjustment of gain in presence of ambient noise.

U.S. Pat. No. 4,944,018 (see [56]) discloses speed controlled amplification.

DE 103 51 145 A1 (see [57]) relates to frequency-depended amplification to overcome a frequency-dependent threshold.

Some known documents relate to noise cancellation.

JP 2003-255954 (see [58]) discloses active noise cancellation using loudspeakers located near listeners.

U.S. Pat. No. 4,977,600 (see [59]) discloses attenuation of picked-up noise for individual seat.

U.S. Pat. No. 5,416,846 (see [60]) describes active noise cancellation with an adaptive filter.

Further known documents relate to array beamforming for audio.

US 2007/0030976 A1 (see [61]) and JP 2004-363696 (see [62]) disclose array beamforming for audio reproduction, delay and sum beamformer.

It would be highly desirable if improved concepts would be provided that provide multizone reproduction within a sufficient range of the audible frequency spectrum.

SUMMARY

According to an embodiment, an apparatus for generating a plurality of loudspeaker signals from two or more audio source signals, wherein each of the two or more audio source signals shall be reproduced in one or more of two or more sound zones, and wherein at least one of the two or more audio source signals shall not be reproduced in at least one of the two more sound zones, may have: an audio preprocessor configured to modify each of two or more initial audio signals to obtain two or more preprocessed audio signals, and a filter configured to generate the plurality of loudspeaker signals depending on the two or more preprocessed audio signals, wherein the audio preprocessor is configured to use the two or more audio source signals as the two or more initial audio signals, or wherein the audio preprocessor is configured to generate for each audio source signal of the two or more audio source signals an initial audio signal of the two more initial audio signals by modifying said audio source signal, wherein the audio preprocessor is configured to modify each initial audio signal of the two or more initial audio signals depending on a signal power or a loudness of another initial audio signal of the two or more initial audio signals, and wherein the filter is configured to generate the plurality of loudspeaker signals depending on in which of the two or more sound zones the two or more audio source signals shall be reproduced and depending on in which of the two or more sound zones the two or more audio source signals shall not be reproduced.

According to another embodiment, a method for generating a plurality of loudspeaker signals from two or more audio source signals, wherein each of the two or more audio source signals shall be reproduced in one or more of two or more sound zones, and wherein at least one of the two or more audio source signals shall not be reproduced in at least one of the two more sound zones, may have the steps of: modifying each of two or more initial audio signals to obtain two or more preprocessed audio signals, and generating the plurality of loudspeaker signals depending on the two or more preprocessed audio signals, wherein the two or more audio source signals are used as the two or more initial audio signals, or wherein for each audio source signal of the two or more audio source signals an initial audio signal of the two more initial audio signals is generated by modifying said audio source signal, wherein each initial audio signal of the two or more initial audio signals is modified depending on a signal power or a loudness of another initial audio signal of the two or more initial audio signals, and wherein the plurality of loudspeaker signals is generated depending on in which of the two or more sound zones the two or more audio source signals shall be reproduced and depending on in which of the two or more sound zones the two or more audio source signals shall not be reproduced.

Another embodiment may have a non-transitory digital storage medium having a computer program stored thereon to perform the method for generating a plurality of loudspeaker signals from two or more audio source signals, wherein each of the two or more audio source signals shall be reproduced in one or more of two or more sound zones, and wherein at least one of the two or more audio source signals shall not be reproduced in at least one of the two more sound zones, the method including: modifying each of two or more initial audio signals to obtain two or more preprocessed audio signals, and generating the plurality of loudspeaker signals depending on the two or more preprocessed audio signals, wherein the two or more audio source signals are used as the two or more initial audio signals, or wherein for each audio source signal of the two or more audio source signals an initial audio signal of the two more initial audio signals is generated by modifying said audio source signal, wherein each initial audio signal of the two or more initial audio signals is modified depending on a signal power or a loudness of another initial audio signal of the two or more initial audio signals, and wherein the plurality of loudspeaker signals is generated depending on in which of the two or more sound zones the two or more audio source signals shall be reproduced and depending on in which of the two or more sound zones the two or more audio source signals shall not be reproduced, when said computer program is run by a computer.

An apparatus for generating a plurality of loudspeaker signals from two or more audio source signals is provided. Each of the two or more audio source signals shall be reproduced in one or more of two or more sound zones, and at least one of the two or more audio source signals shall not be reproduced in at least one of the two more sound zones. The apparatus comprises an audio preprocessor configured to modify each of two or more initial audio signals to obtain two or more preprocessed audio signals. Moreover, the apparatus comprises a filter configured to generate the plurality of loudspeaker signals depending on the two or more preprocessed audio signals. The audio preprocessor is configured to use the two or more audio source signals as the two or more initial audio signals, or wherein the audio preprocessor is configured to generate for each audio source signal of the two or more audio source signals an initial audio signal of the two more initial audio signals by modifying said audio source signal. Moreover, the audio preprocessor is configured to modify each initial audio signal of the two or more initial audio signals depending on a signal power or a loudness of another initial audio signal of the two or more initial audio signals. The filter is configured to generate the plurality of loudspeaker signals depending on in which of the two or more sound zones the two or more audio source signals shall be reproduced and depending on in which of the two or more sound zones the two or more audio source signals shall not be reproduced.

Moreover, a method for generating a plurality of loudspeaker signals from two or more audio source signals is provided. Each of the two or more audio source signals shall be reproduced in one or more of two or more sound zones, and at least one of the two or more audio source signals shall not be reproduced in at least one of the two more sound zones. The method comprises:

Modifying each of two or more initial audio signals to obtain two or more preprocessed audio signals. And:

Generating the plurality of loudspeaker signals depending on the two or more preprocessed audio signals.

The two or more audio source signals are used as the two or more initial audio signals, or wherein for each audio source signal of the two or more audio source signals an initial audio signal of the two more initial audio signals is generated by modifying said audio source signal. Each initial audio signal of the two or more initial audio signals is modified depending on a signal power or a loudness of another initial audio signal of the two or more initial audio signals. The plurality of loudspeaker signals is generated depending on in which of the two or more sound zones the two or more audio source signals shall be reproduced and depending on in which of the two or more sound zones the two or more audio source signals shall not be reproduced.

Moreover, computer programs are provided, wherein each of the computer programs is configured to implement one of the above-described methods when being executed on a computer or signal processor.

Some embodiments provide a signal-dependent level modification to reduce the perceived acoustic leakage when using measures for directional reproduction of independent entertainment signals.

In embodiments, optionally, a combination of difference reproduction concepts for different frequency bands is employed.

Optionally, some embodiments use least-squares optimized FIR filters (FIR=finite impulse response) based on once measured impulse responses. Details of some embodiments are described below, when a prefilter according to embodiments is described.

Some of the embodiments are optionally employed in an automotive scenario, but are not limited to such a scenario.

Some embodiments relate to concepts that provide individual audio content to listeners occupying the same enclosure without the use of headphones or alike. Inter alia, these embodiments differ from the state-of-the-art by a smart combination of different reproduction approaches with a signal-dependent preprocessing such that a large perceptual acoustic contrast is achieved while retaining a high level of audio quality.

Some embodiments provide a filter design.

Some of the embodiments employ additional signal-dependent processing.

BRIEF DESCRIPTION OF THE DRAWINGS

Embodiments of the present invention will be detailed subsequently referring to the appended drawings, in which.

DETAILED DESCRIPTION OF THE INVENTION

Figure 1:
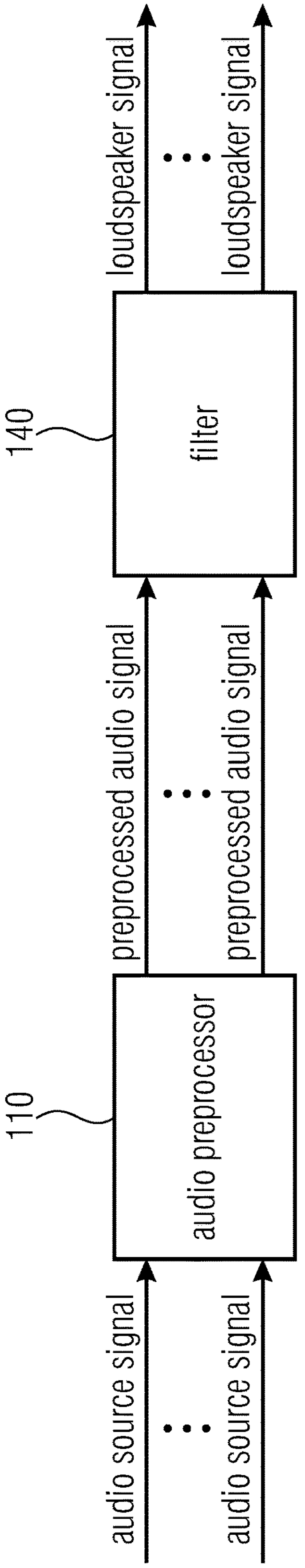
FIG. 1 illustrates an apparatus for generating a plurality of loudspeaker signals from two or more audio source signals according to an embodiment.

FIG. 1 illustrates an apparatus for generating a plurality of loudspeaker signals from two or more audio source signals according to an embodiment. Each of the two or more audio source signals shad be reproduced in one or more of two or more sound zones, and at least one of the two or more audio source signals shah not be reproduced in at least one of the two more sound zones.

The apparatus comprises an audio preprocessor 110 configured to modify each of two or more initial audio signals to obtain two or more preprocessed audio signals. Moreover, the apparatus comprises a filter 140 configured to generate the plurality of loudspeaker signals depending on the two or more preprocessed audio signals. The audio preprocessor 110 is configured to use the two or more audio source signals as the two or more initial audio signals, or wherein the audio preprocessor 110 is configured to generate for each audio source signal of the two or more audio source signals an initial audio signal of the two more initial audio signals by modifying said audio source signal. Moreover, the audio preprocessor 110 is configured to modify each initial audio signal of the two or more initial audio signals depending on a signal power or a loudness of another initial audio signal of the two or more initial audio signals.

The filter 140 is configured to generate the plurality of loudspeaker signals depending on in which of the two or more sound zones the two or more audio source signals shall be reproduced and depending on in which of the two or more sound zones the two or more audio source signals shall not be reproduced.

While the approaches of the state of the art can achieve a considerable acoustic contrast, the contrast achieved by conventional methods is typically not sufficient to provide multiple unrelated acoustic scenes to inhabitants of the same enclosure, whenever high-quality audio reproduction may be useful.

The acoustic contrast perceived by the listeners shall be improved, which is dependent on the acoustic contrast as defined in Equation (14) above, but not identical to it. It shall be achieved that the acoustic contrast perceived by the listeners is increased rather than maximizing the contrast of acoustic energy. The perceived acoustic contrast will be referred to as subjective acoustic contrast, while the contrast in acoustic energy will be referred to as objective acoustic contrast in the following. Some embodiments employ measures to facilitate directional audio reproduction and measures to shape the acoustic leakage such that it becomes less noticeable.

Figure 7:
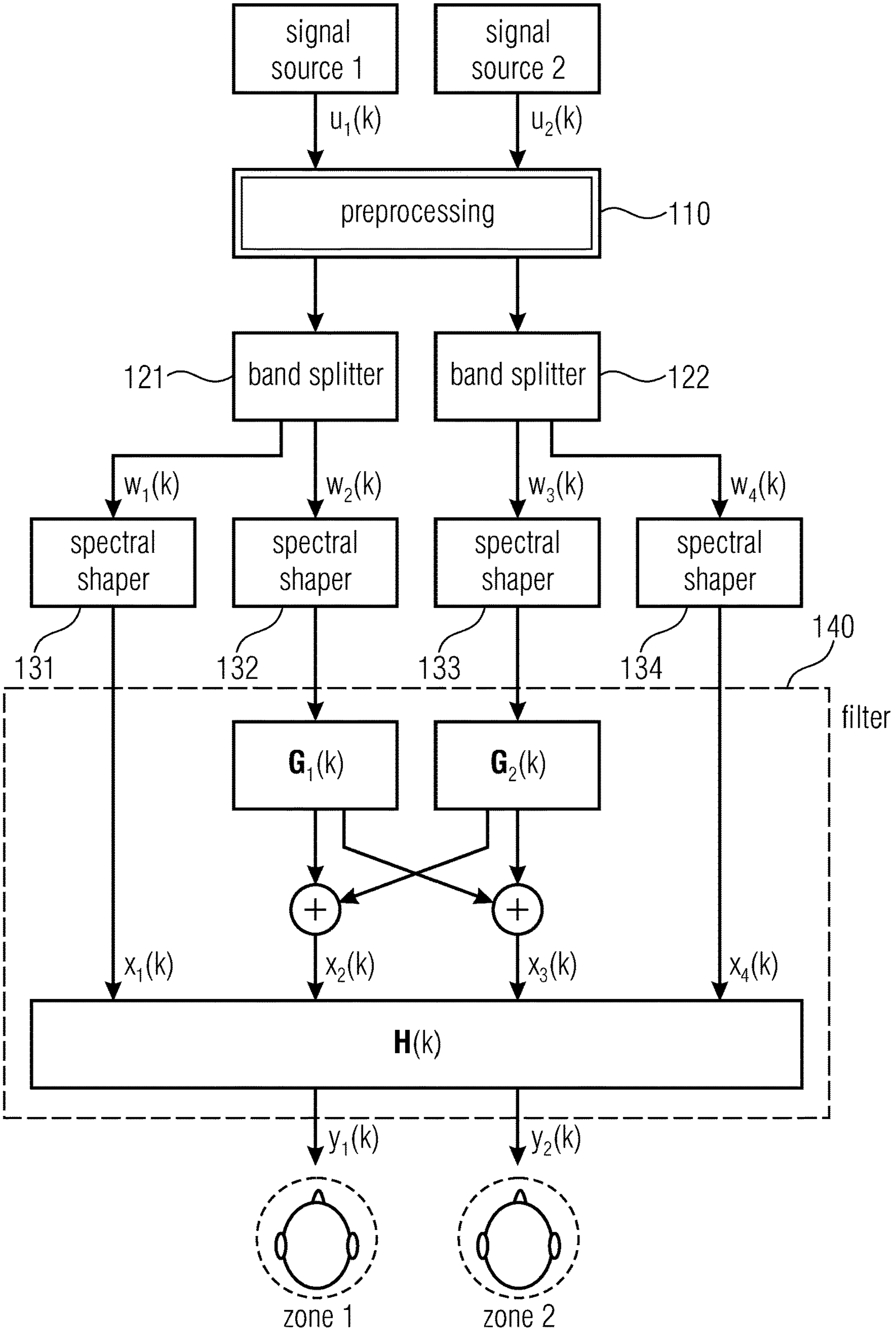
FIG. 7 illustrates multizone reproduction with arrays according to an embodiment.

In addition to FIG. 1, the apparatus of FIG. 7 further comprises two (optional) band splitters 121, 122 and four (optional) spectral shapers 131, 132, 133, 134.

According to some embodiments the apparatus may, e.g., further comprise two or more band splitters 121, 122 being configured to conduct band splitting on the two or more preprocessed audio signals to a plurality of band-splitted audio signals. The filter 140 may, e.g., be configured to generate the plurality of loudspeaker signals depending on the plurality of band-splitted audio signals.

In some embodiments, the apparatus may, e.g., further comprises one or more spectral shapers 131, 132, 133, 134 being configured to modify a spectral envelope of one or more of the plurality of band-splitted audio signals to obtain one or more spectrally shaped audio signals. The filter 140 may, e.g., configured to generate the plurality of loudspeaker signals depending on the one or more spectrally shaped audio signals.

In FIG. 7 a signal model of an implementation according to embodiments is shown. In particular, FIG. 7 illustrates multizone reproduction with arrays according to embodiments. This example has been chosen for conciseness, noting that the method is generally applicable to scenarios with $N_S$ signal sources, $N_L$ loudspeakers, and $N_Z$ listening zones, as described above.

There are two signal sources shown in FIG. 7, which provide two independent signals that are fed to a "Preprocessing" stage. This preprocessing stage may, for example, in some embodiments implement a parallel processing for both signals (i.e., no mixing). Unlike the other processing steps, this processing step does not constitute a LTI system (Linear Time-Invariant System). Instead, this processing block determines time-varying gains for all processed source signals, such that their difference in reproduction level is reduced. The rationale behind this is that the acoustic leakage in each zone is linearly dependent on the scenes reproduced in the respective other zones. At the same time, the intentionally reproduced scenes can mask the acoustic leakage. Hence, the perceived acoustic leakage is proportional to the level difference between the scenes that are intentionally reproduced in the respective zones. As a consequence, reducing the level difference of the reproduced scenes will also reduce the perceived acoustic leakage and, hence, increase the subjective acoustic contrast. A more detailed explanation can be found when preprocessing is described below.

The (optional) band splitters 121, 122 realize the (optional) processing step band splitting, and split the signal into multiple frequency bands, just like an audio crossover would do in a multi-way loudspeaker. However, unlike audio crossovers in a loudspeaker, it is only a second objective of this band splitter to maximize the radiated acoustic power. The primary objective of this band splitter is to distribute the individual frequency bands to individual reproduction measures such that the acoustic contrast is maximized, given certain quality constraints. For example, the signal $w_1(k)$ will later be fed to a single loudspeaker as signal $x_1(k)$. Given this loudspeaker is a directional loudspeaker, $w_1(k)$ would be high-pass filtered because the directivity of this loudspeaker will be low at low frequencies. On the other hand, $w_2(k)$ will later be filtered to obtain $x_2(k)$ and $x_3(k)$ such that the according loudspeakers are used as an electrically steered array. In a more complex scenario, there can be more outputs of the band splitter such that the signals are distributed to multiple reproduction methods according to the needs of the application (see also below, where a loudspeaker-enclosure-microphone system according to embodiments is described).

As discussed above, the measures for directional reproduction applied later will exhibit a certain leakage from one zone to the other. This leakage can be measured as break down in acoustic contrast between the zones. In a complex setup, these breakdowns can occur at multiple points in the frequency spectrum for each of the envisaged directional reproduction methods, which constitute a major obstacle in the application of those methods. It is well-known that timbre-variations are acceptable to a certain extent. These degrees of freedom can be used to attenuate contrast-critical frequency bands.

Thus, the (optional) spectral shapers 131, 132, 133, 134 are designed in a way such that the signals reproduced later are attenuated in these parts of the frequency spectrum, where a low acoustic contrast is expected. Unlike the band splitters, the spectral shapers are intended to modify the timbre of the reproduced sound. Moreover, this processing stage can also involve delays and gains such that the intentionally reproduced acoustic scene can spatially mask the acoustic leakage.

The blocks denoted by $G_1(k)$ and $G_2(k)$ may, e.g., describe linear time-invariant filters that are optimized to maximize the objective acoustic contrast given subjective quality constraints. There are various possibilities to determine those filters, which include (but are no limited to) ACC, pressure matching (see [4] and [6]), and loudspeaker beamforming. It was found, that a least squared pressure matching approach as described below, when a prefilter according to embodiments is described, is especially suitable, when measured impulse responses are considered for the filter optimization. This can be an advantageous concept for implementation.

Other embodiments employ the above approach by operating on calculated impulse responses. In particular embodiments, impulse responses are calculated to represent the free-field impulse responses from the loudspeakers to the microphones.

Further embodiments, employ the above approach by operating on calculated impulse responses that have been obtained using image source model of the enclosure.

It should be noted that the impulse responses are measured once such that no microphones may be used during operation. Unlike ACC, the pressure matching approach prescribes a given magnitude and phase in the respective bright zone. This results in a high reproduction quality. Traditional beamforming approaches are also suitable when high frequencies should be reproduced.

The block denoted by H(k) represents the LEMS, where each input is associated with one loudspeaker. Each of the outputs is associated with an individual listener that receives the superposition of all loudspeaker contributions in his individual sound zone. The loudspeakers that are driven without using the prefilters $G_1(k)$ and $G_2(k)$ are either directional loudspeakers radiating primary into one sound zone or loudspeaker that are arranged near (or in) an individual sound zone such that they primarily excite sound in that zone. For higher frequencies, directional loudspeakers can be build without significant effort. Hence, these loudspeakers can be used to provide the high-range frequencies to the listeners, where the loudspeakers do not have to be placed directly at the listeners ears.

In the following, embodiments of the present invention are described in more detail.

At first, preprocessing according to embodiments are described. In particular, an implementation of the block denoted by "Preprocessing" in FIG. 7 is presented. For providing a better understanding, the following explanations concentrate on only one mono signal per zone. However, a generalization to multichannel signals is straightforward. Thus, some embodiments exhibit multichannel signals per zone.

Figure 8:
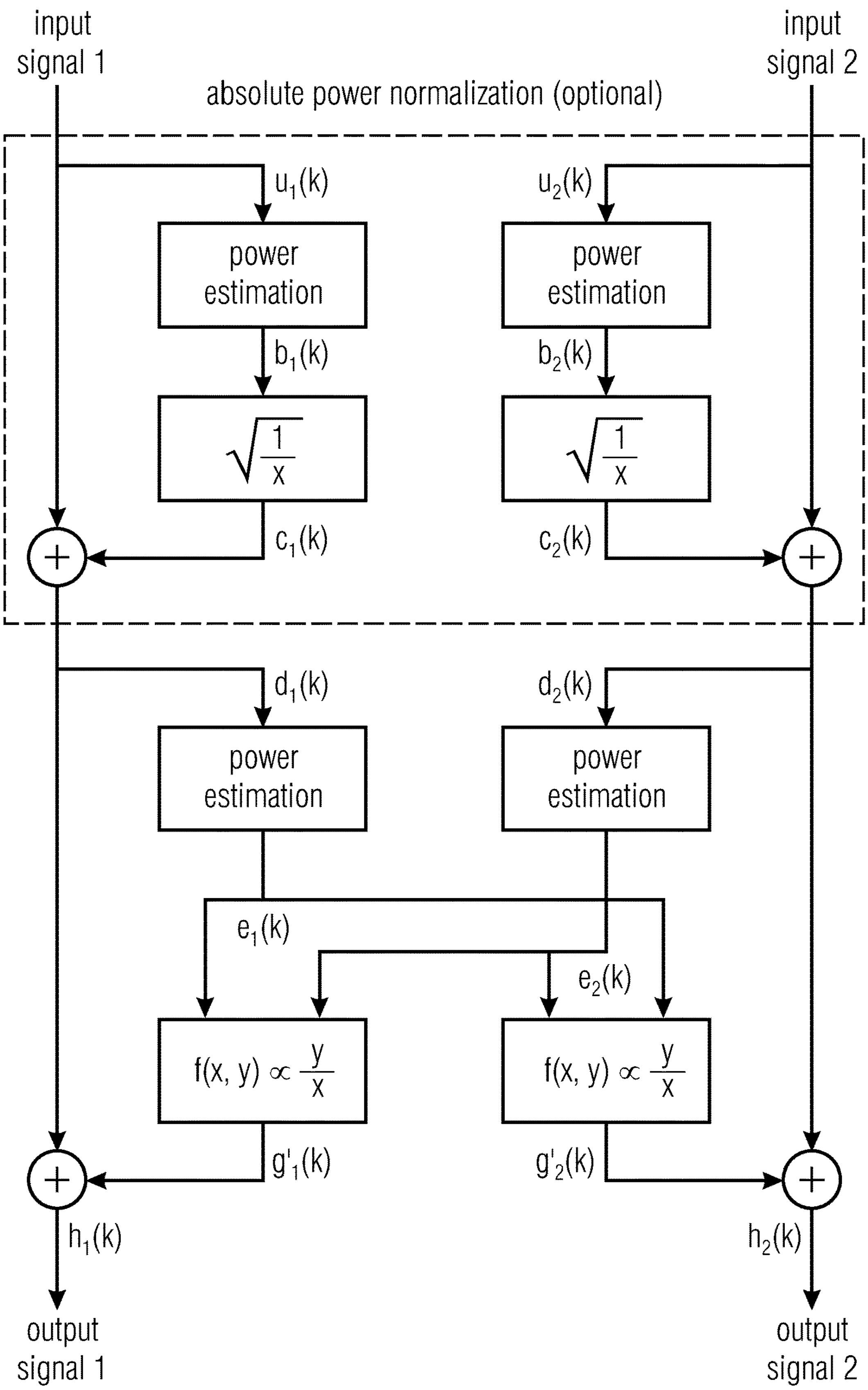
FIG. 8 illustrates a sample implementation of an audio preprocessor according to an embodiment.

FIG. 8 illustrates a sample implementation of an audio preprocessor 110 and a corresponding signal model according to an embodiment. As described above, the two input signals $u_1(k)$ and $u_2(k)$ are intended to be primarily reproduced in Zone 1 and Zone 2, respectively. On the other hand, there is some acoustic leakage in the reproduction of $u_1(k)$ to Zone 2 and in the reproduction of $u_2(k)$ to Zone 1.

The two input signals $u_1(k)$ and $u_2(k)$ are also referred to as audio source signals in the following.

In a first, optional, stage, the power of both input signals, $u_1(k)$ and $u_2(k)$ (the audio source signals) is normalized to alleviate the parameter choice for the following processing.

Thus, according to an optional embodiment, the audio preprocessor (110) may, e.g., be configured to generate the two more initial audio signals $d_1(k)$ and $d_2(k)$ by normalizing a power of each of the two or more audio source signals $u_1(k)$ and $u_2(k)$.

The obtained power estimates $b_1(k)$ and $b_2(k)$ typically describe a long-term average, in contrast to the estimators used in a later stage that are typically considering a smaller time span. The update of $b_1(k)$ and $b_2(k)$ can be connected with an activity detection for $u_1(k)$ and $u_2(k)$, respectively, such that the update of $b_1(k)$ or $b_2(k)$ is held, when there is no activity in $u_1(k)$ or $u_7(k)$. The signals $c_1(k)$ and $c_2(k)$ may, e.g., be inversely proportional to $b_1(k)$ and $b_2(k)$, respectively, such that a multiplication of $c_1(k)$ and $c_2(k)$ with $u_1(k)$ and $u_2(k)$, respectively, yields the signals, $d_1(k)$ and $d_2(k)$ that would exhibit comparable signal power. While using this first stage is not absolutely necessary, it ensures a reasonable working point for the relative processing of the signals $d_1(k)$ and $d_2(k)$, which alleviates finding suitable parameters for the following steps. It should be noted that if multiple instances of this processing block are placed after the "Band splitter" blocks or the "Spectral shaper" blocks, the power normalization has still to be applied before the "Band splitter" blocks.

By a normalization of the signals, their relative level difference is already reduced. However this is typically not enough for the intended effect, because the power estimates are long-term, while the level variations of typical acoustic scenes are rather short-term processes. In the following, it is explained how the difference in relative power of the individual signals is explicitly reduced on a short-term basis, which constitutes the primary objective of the preprocessing block.

The two signals $d_1(k)$ and $d_2(k)$ that are supposed to be scaled and reproduced, are also referred to as initial audio signals in the following.

As described above, the audio preprocessor 110 may, e.g., configured to generate for each audio source signal of the two or more audio source signals $u_1(k)$, $u_2(k)$ an initial audio signal of the two more initial audio signals $d_1(k)$, $d_2(k)$ by modifying said audio source signal, e.g., by conducting power normalization.

In alternative embodiments, however, the audio preprocessor 110 may, e.g., be configured to use the two or more audio source signals $u_1(k)$, $u_2(k)$ as the two or more initial audio signals $d_1(k)$, $d_2(k)$.

In FIG. 7, the two signals $d_1(k)$ and $d_2(k)$ may, e.g., be fed to further loudness estimators, e.g., of the audio preprocessor 110, which provide the signals $e_1(k)$ and $e_2(k)$, respectively.

These signals may, e.g., be used to determine the scaling factors $g'_1(k)$ and k) according to $$g'_1=f(e_1,e_2), \quad (17)$$

$$g'_2=f(e_2,e_1), \quad (18)$$

where, in some embodiments, $f(x,y)$ is a function that is monotonically increasing with respect to y and monotonically decreasing with respect to x, while its value may, for example, be limited to an absolute range.

As a consequence, the value of $f(x,y)$ may, e.g., also be monotonically increasing with the ratio y/x.

The factors $g'_1(k)$ and $g'_2(k)$ are then used to scale the signals $d_1(k)$ and $d_2(k)$, respectively, to obtain the output signals $h_1(k)$ and $h_2(k)$. The output signals $h_1(k)$ and $h_2(k)$ may, e.g., be fed into one or more modules which are configured to conduct multizone reproduction, e.g., according to an arbitrary multizone reproduction method.

Thus, in some embodiments, the audio preprocessor 110 may, e.g., be configured to modify each initial audio signal of the two or more initial audio signals depending on the signal power or the loudness of another initial audio signal of the two or more initial audio signals by modifying said initial audio signal of the two or more initial audio signals depending on a ratio of a first value (y) to a second value (x). The second value (x) may, e.g., depend on the signal power of said initial audio signal, and the first value (y) may, e.g., depend on the signal power of said another initial audio signal of the two or more initial audio signals. Or, the second value (x) may, e.g., depend on the loudness of said initial audio signal, and the first value (y) may, e.g., depend on the loudness of said another initial audio signal of the two or more initial audio signals.

According to some embodiments, the audio preprocessor 110 may, e.g., be configured to modify each initial audio signal of the two or more initial audio signals depending on the signal power or the loudness of another initial audio signal of the two or more initial audio signals by determining a gain for said initial audio signal and by applying the gain on said initial audio signal. Moreover, the audio preprocessor 110 may, e.g., be configured to determine the gain depending on the ratio between the first value and the second value, said ratio being a ratio between the signal power of said another initial audio signal of the two or more initial audio signals and the signal power of said initial audio signal as the second value, or said ratio being a ratio between the loudness of said another initial audio signal of the two or more initial audio signals and the loudness of said initial audio signal as the second value.

In some embodiments, the audio preprocessor 110 may, e.g., be configured to determine the gain depending on a function that monotonically increases with the ratio between the first value and the second value.

According to some embodiments, e.g., none of the signals $u_1(k)$, $d_1(k)$, or $h_1(k)$ is mixed to any of the signals $u_2(k)$, $d_2(k)$, or $h_2(k)$.

In the following, the implementation of the processing step is explained in more detail. Since the processing steps for $u_1(k)$ and $u_2(k)$ are identical, only the processing steps for $u_1(k)$ will be described, which are also applied to $u_2(k)$ by exchanging the indices 1 and 2.

A rule to obtain $b_1(k)$ may, e.g., be given by $$b_1(k)=\lambda_1 b_1(k-1)+(1-\lambda_1)\Sigma_{i=1}^{L} u_1^2(k,l), \quad (19)$$

where $\lambda_1$ may, e.g., be chosen close to but less than 1.

In the above-formula $u_1(k,l)$ is assumed to comprise one or more audio channels. L indicates the number of audio channels of $u_1(k)$.

In a simple case, lit (k) comprises only a single channel and formula (19) becomes:

$$b_1(k)=\lambda_1 b_1(k-1)+(1-\lambda_1)u_1^2(k,l) \quad (19a)$$

$\lambda_1$ may be in the range $0<\lambda_1<1$. Advantageously, $\lambda_1$ may, e.g., be close to 1. For example, $\lambda_1$ may, e.g., be in the range $0.9<\lambda_1<1$.

In other cases $u_1(k)$ for example, comprises two or more channels.

The scaling factor $c_1(k)$ can then be determined according to $$c_1(k) = \frac{1}{\sqrt{b_1(k)}}, \tag{20}$$

such that $$d_1(k,l)=c_1(k)u_1(k,l) \tag{21}$$

describes the scaled audio signal.

A rule to obtain $e_1(k)$ may, e.g., be given by $$e_1(k)=\lambda_2 e_1(k-1)+(1-\lambda_2)\Sigma_{l=1}^{L} d_1^{\,2}(k,l), \tag{22}$$

$\lambda_2$ may be in the range $0<\lambda_2<1$.

In embodiments, for $\lambda_1$ of formula (19) and A, of formula (22): $\lambda_1>\lambda_2$.

While there is a variety of other options. One of them, according to an embodiment, is the mean square value of $d_1^{\,2}(k,l)$ in a window of K samples given by $$e_1(k) = \frac{1}{K}\sum_{n=-}^{K-1}\sum_{l=1}^{L} d_1^2(k-n,\, l), \tag{23}$$

Another definition, according to another embodiment, is the maximum squared value in such a window $$e_1(k) = \max_{n=0,1,\ldots,K-1,\; l=1,2,\ldots,L} d_1^2(k-n,\, l). \tag{24}$$

According to some embodiments, to determine $g'_1(k)$, the value $e_2(k)$ has also to be determined as described above. However, the actual method to determine $e_2(k)$, as well as the parameters, may differ from those chosen for $e_1(k)$ (for example, depending on the needs of the application). The actual gain $g'_1(k)$ can, e.g., be determined similar to the gaining rule that would be used for a conventional audio compressor, see:

https://en.wikipedia.org/wiki/Dynamic_range_compression (see [65]).

but considering both, $e_1(k)$ and $e_2(k)$.

According to an embodiment, a gaining rule of an according downward compressor for the signal $d_1(k)$ would be $$g'_1(k) == \begin{cases} 10^{(T_1 - 10\log_{10}(e_1(k)) + 10\log_{10}(e_2(k)))(R-1)/(20R)} & \text{for } T_1 - 10\log_{10}(e_1(k)) + 10\log_{10}(e_2(k)) < 0 \\ 1 & \text{otherwise} \end{cases}, \tag{25}$$

or $$g'_1(k) = \begin{cases} 10^{(T_1+v)(R-1)/(20R)} & \text{for } T_1 + v < 0 \\ 1 & \text{otherwise} \end{cases}, \tag{25'}$$

with $$v = -10\log_{10}(e_1(k)) + 10\log_{10}(e_2(k))$$

where $T_1$ defines the compression threshold in dB and R the compression ratio, as used in a standard audio compressor. E.g., $1\le R\le 100$. For example, $1<R<100$. For example, $2<R<100$, E.g., $2<R<50$.

In contrast to formulae (25) and (25'), a standard audio compressor according to the state of the art would not consider $e_2(k)$ for determining a gain for $d_1(k)$.

Other options are an implementation of an upward compressor defined by $$g'_1(k) == \begin{cases} 10^{(T_2 - 10\log_{10}(e_1(k)) + 10\log_{10}(e_2(k)))(R-1)/(20R)} & \text{for } T_2 - 10\log_{10}(e_1(k)) + 10\log_{10}(e_2(k)) > 0 \\ 1 & \text{otherwise} \end{cases}, \tag{25a}$$

or $$g'_1(k) = \begin{cases} 10^{(T_2+v)(R-1)/(20R)} & \text{for } T_2 + v > 0 \\ 1 & \text{otherwise} \end{cases}, \tag{25a'}$$

with $$v = -10\log_{10}(e_1(k)) + 10\log_{10}(e_2(k))$$

which is similar except for the operating range (note the different condition) and different parameters. It should be noted that $T_2$ defines a lower threshold in contrast to $T_1$.

Some embodiments, where $T_2<T_1$ combine both gaining rules.

In embodiments, the resulting rule to obtain $g'_1(k)$ and $g'_2(k)$ can be any combination of upward and downward compressors, where practical implementations will typically involve setting bound to the considered ranges of $e_1(k)$ and $e_2(k)$.

When more than two signals $e_1(k)$, $e_2(k)$, $e_3(k)$, . . . , $e_N(k)$, for example, N signals, are considered, formula (25) may, e.g., become:

$$g'_1(k) = \begin{cases} 10^{(T_1+v_1)(R-1)/(20R)} & \text{for } T_1 + v_1 < 0 \\ 1 & \text{otherwise} \end{cases}, \tag{25b}$$

with $$v_1 = -10\log_{10}(e_1(k)) + 10\log_{10}\left(\sum_{i=2}^{N} e_i(k)\right)$$

For other gains $g'_2(k)$, $g'_3(k)$, . . . , $g'_N(k)$, formula (25) may, e.g., become:

$$g'_r(k) = \begin{cases} 10^{(T_1+v_2)(R-1)/(20R)} & \text{for } T_1 + v_2 < 0 \\ 1 & \text{otherwise} \end{cases}, \tag{25c}$$

with $$v_2 = -10\log_{10}(e_r(k)) + 10\log_{10}\left(-e_r(k) + \sum_{i=1}^{N} e_i(k)\right)$$

Formula (25a) may, e.g., become:

$$g_1'(k)=\begin{cases}10^{(T_2+v_1)(R-1)/(20R)} & \text{for } T_2+v_1>0\\ 1 & \text{otherwise}\end{cases}, \tag{25b}$$

with $$v_1=-10\log_{10}(e_1(k))+10\log_{10}\left(\sum_{i=2}^{n}e_i(k)\right)$$

For other gains $g'_2(k)$, $g'_3(k)$, . . . , $g'_N(k)$, formula (25a) may, e.g., become:

$$g_r'(k)=\begin{cases}10^{(T_2+v_2)(R-1)/(20R)} & \text{for } T_2+v_2>0\\ 1 & \text{otherwise}\end{cases}, \tag{25c}$$

with $$v_2=-10\log_{10}(e_r(k))+10\log_{10}\left(-e_r(k)+\sum_{i=1}^{N}e_i(k)\right)$$

Further alternative rules can be defined to reduce the energy difference between both scenes as given by $$g_1'(k)=(1-\alpha)+\alpha\sqrt{\frac{e_2(k)}{e_1(k)}} \tag{25d}$$

where $\alpha=1$ would cause the signal $h_1(k)$ to have the same energy as the signal $d_2(k)$. On the other hand, $\alpha=0$ would have no effect, a chosen parameter $0<\alpha<1$ can be used to vary the intended influence of that step.

Another opportunity is the use of a sigmoid function to limit the energy overshot of $h_2(k)$ compared to $d_1(k)$ $$g_1'(k)=\sqrt{\frac{e_2(k)}{e_1(k)}f\left(\frac{e_1(k)}{e_2(k)}\right)} \tag{25e}$$

where $f(x)$ can be one of $$f(x)=\frac{x}{\sqrt{1+x^2}},$$

$$f(x)=\frac{x}{1+|x|},$$

$$f(x)=\tanh(x),$$

$$f(x)=\frac{2}{\pi}\arctan\left(\frac{\pi}{2}x\right),$$

which are all limited by $-1<f(x)<1$ while $f'(0)=1$ holds.

In some embodiments, the audio preprocessor 110 may, e.g., be configured to modify an initial audio signal of the two or more initial audio signals depending on the signal power or the loudness of another initial audio signal of the two or more initial audio signals by determining a gain $g'_1(k)$ for said initial audio signal and by applying the gain $g'_1(k)$ on said initial audio signal, and the audio preprocessor 110 may, e.g., be configured to determine the gain $g'_1(k)$ according to one or more of the above formulae.

In the following, further features of preprocessing according to embodiments are described.

According to an embodiment, the branch of the signals $e_1(k)$ and $e_2(k)$ that is fed to the respectively opposite side may, e.g., be filtered through a filter describing the actual acoustic coupling of the two zones.

Moreover, according to an embodiment, the power estimators may, e.g., operate on signals that have been processed by a weighting filter, for example, that have been processed by a weighting filter described in:

https://en.wikipedia.org/wiki/Weighting_filter (see [66]).

According to an embodiment, the power estimators may, e.g., be replaced by loudness estimators as, e.g., described by ITU-R Recommendation BS.1770-4. This will allow for an improved reproduction quality because the perceived loudness is better matched by this model.

Furthermore, according to an embodiment, a level threshold may, e.g., be used to exclude silence from being taken into account for the estimates $b_1(k)$ and $b_2(k)$ in the absolute power normalization.

Moreover, in an embodiment, a positive time-derivative of the separately estimated power can be used as an indicator for activity of the input signals $u_1(k)$ and $u_2(k)$. The estimates $b_1(k)$ and $b_2(k)$ are then only updated when activity is detected.

In the following, a band splitter according to embodiments is described. In particular, an implementation of the block denoted by “Band splitter” shown in FIG. 7 is presented. In an embodiment, this block may, e.g., be realized as a digital audio crossover, for example, as a digital audio crossover as described in:

https://en.wikipedia.org/wiki/Audio_crossover#Digital (see [67]).

The desired frequency response of the input to output paths may, e.g., be a band pass with a flat frequency response in the pass band and a high attenuation in the stop band. The borders of pass bands and stop bands are chosen depending on the frequency range in which the reproduction measures connected to individual outputs can achieve a sufficient acoustics contrast between the respective sound zones.

Figure 9:
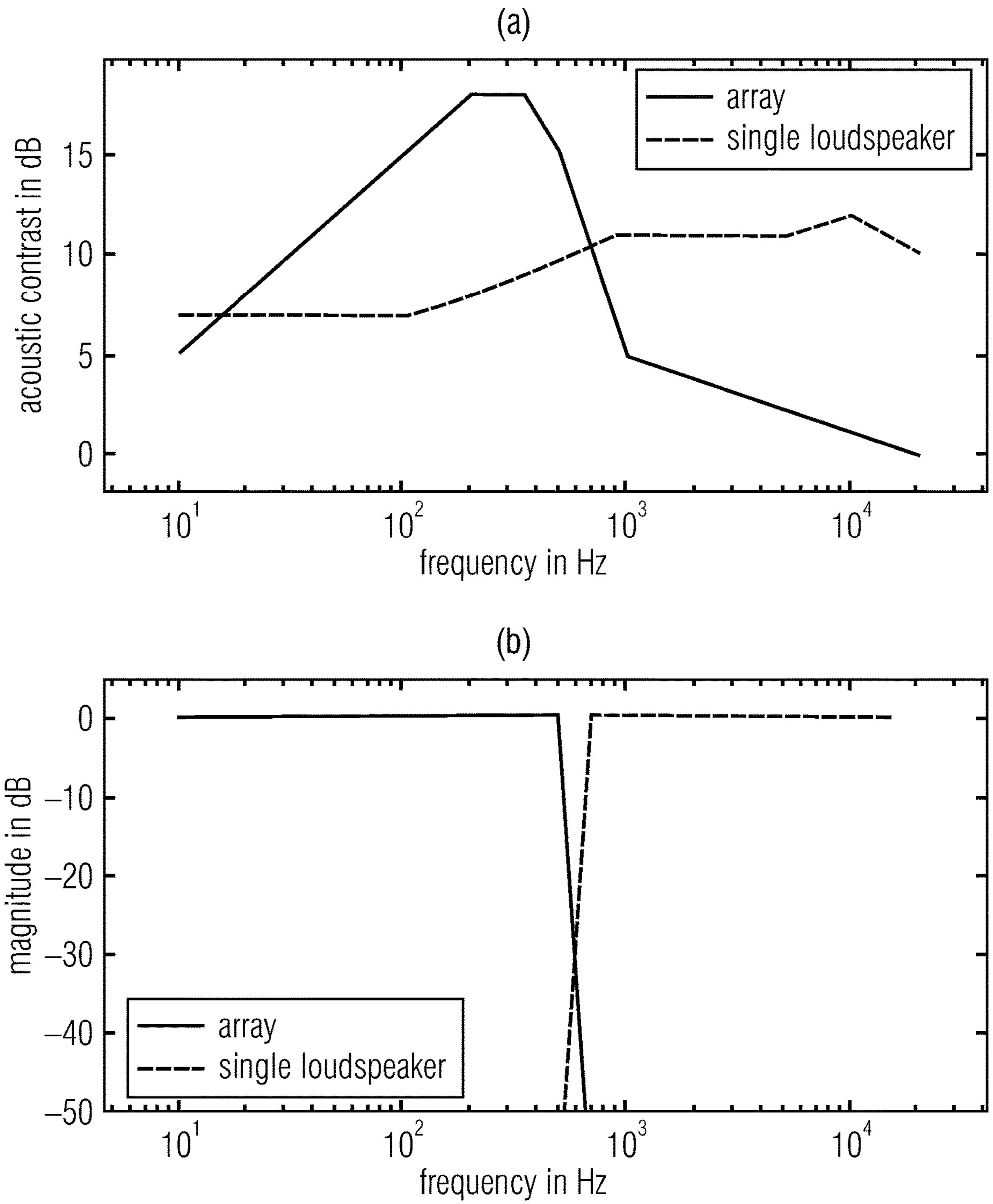
FIG. 9 illustrates an exemplary design of the band splitters according to embodiments, wherein (a) illustrates acoustic contrast achieved by different reproduction methods, and wherein (b) illustrates a chosen magnitude response of the audio crossover.

FIG. 9 illustrates an exemplary design of the one or more band splitters according to embodiments, wherein (a) illustrates acoustic contrast achieved by different reproduction methods, and wherein (b) illustrates a chosen magnitude response of the audio crossover. In particular, FIG. 9 illustrates an exemplary design of the filter magnitude response in relation to the achieved acoustic contrast.

As can be seen from FIG. 9, the spectral shaper may, e.g., be configured to modify a spectral envelope of an audio signal depending on the acoustic contrast.

Various concepts may be employed to realize the actual implementation of the one or more band splitters. For example, some embodiments employ FIR filters, other embodiments employ an IIR filter, and further embodiments employ analog filters. Any possible concept for realizing band splitters may be employed, for example any concept that is presented in general literature on that topic.

Some of the embodiments may, for example, comprise a spectral shaper for conducting spectral shaping. When spectral shaping is conducted on an audio signal, the spectral envelope of that audio signal may, e.g., modified and a spectrally-shaped audio signal may, e.g., be obtained.

In the following, a spectral shaper according to embodiments is described, in particular, a spectral shaper” as illustrated in FIG. 7. Spectral shapers constitute filters that exhibit frequency responses similar to those known for equalizers, such as combinations of first-order or second-order filters, see:

https://en.wikipedia.org/wiki/Equalization_(audio)#Filter_functions (see [68]).

However, the eventual frequency responses of spectral filter are designed in a completely different way compared to equalizers: Spectral filters consider the maximum spectral distortion that will be accepted by the listener, and the spectral filters are designed such they attenuate those frequencies which are known to produce acoustic leakage.

The rational behind this is that human perception is differently sensitive to spectral distortions of acoustic scenes at certain frequencies, depending on the excitation of the surrounding frequencies and depending on whether the distortion is an attenuation or an amplification.

For example, if a notch filter with a small bandwidth is applied to a broadband audio signal, the listeners will only perceive a small difference, if any. However, if a peak filter with the same bandwidth is applied to the same signal, the listeners will most likely perceive a considerable difference.

Figure 5:
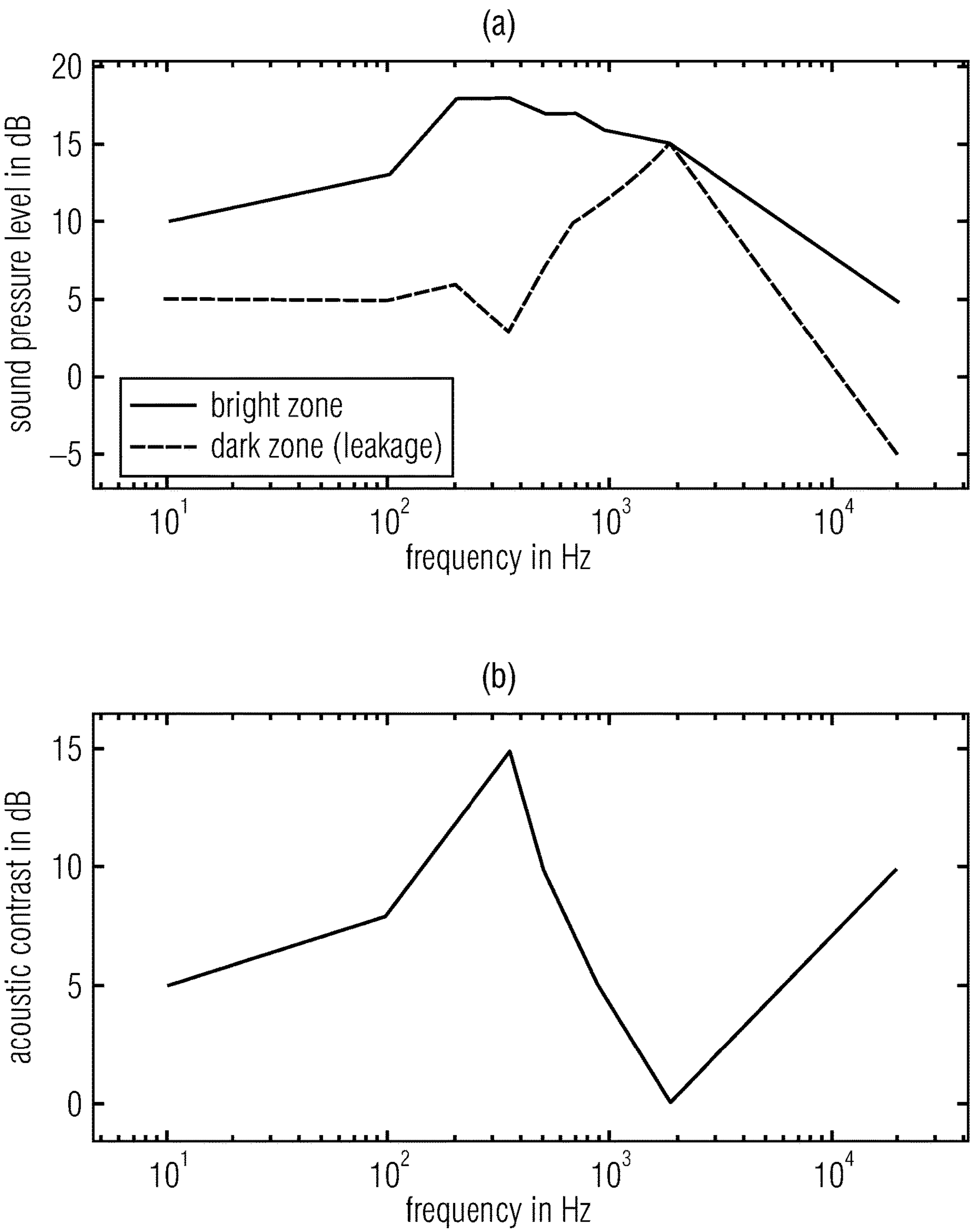
FIG. 5 illustrates in (a) an exemplary reproduction level in bright and dark zone, and illustrates in (b) a resulting acoustic contrast.
Figure 6:
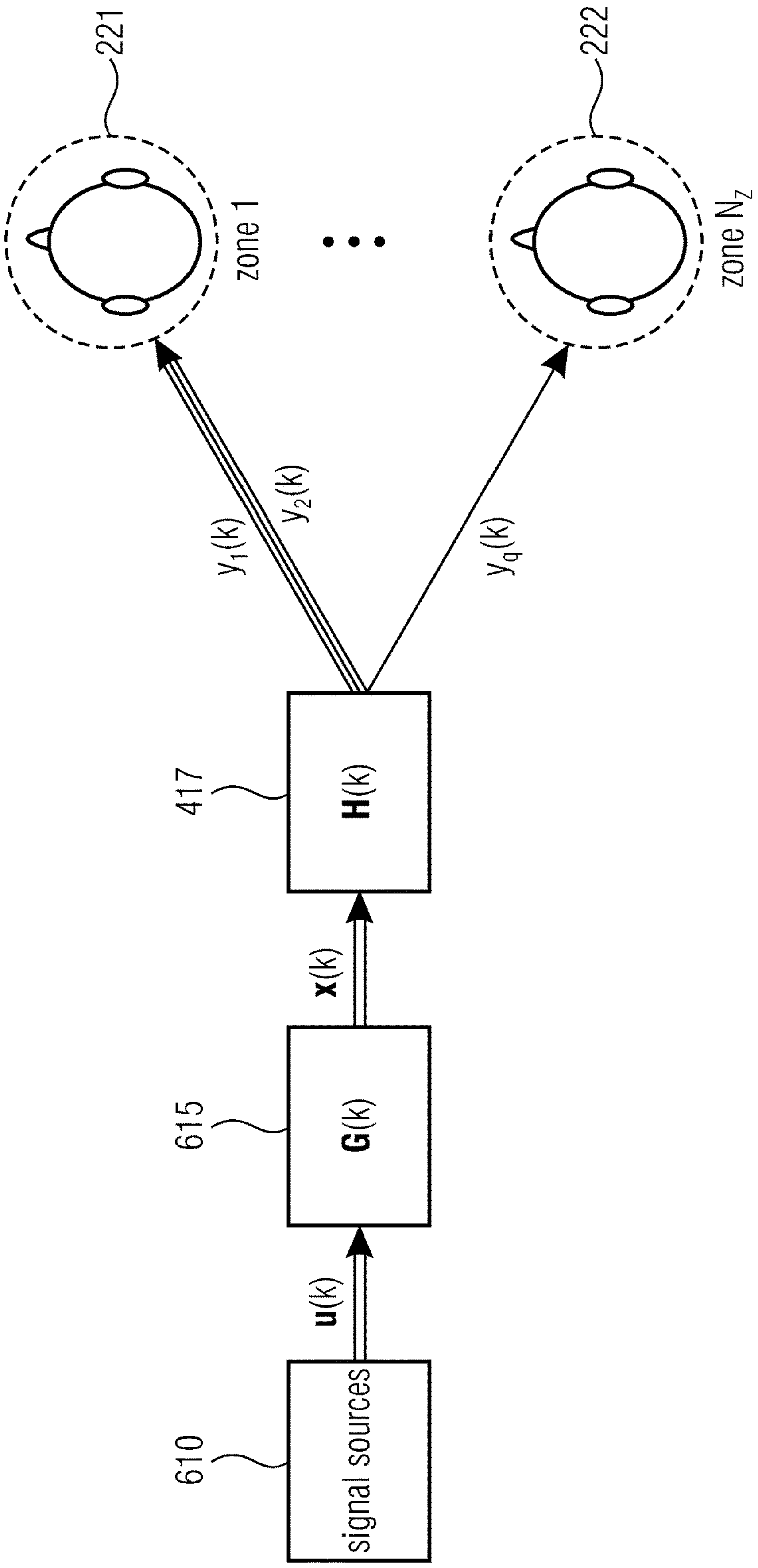
FIG. 6 illustrates a general signal model of multizone reproduction with arrays.

Embodiments are based on the finding that this fact can be exploited because a band-limited breakdown in acoustic contrast results in a peak in acoustic leakage (see FIG. 5). If the acoustic scene reproduced in the bright zone is filtered by an according notch filter, it will most likely not be perceived by the listeners in this zone. On the other hand, the peak of acoustic leakage that is perceived in the dark zone will be compensated by this measure.

Figure 10:
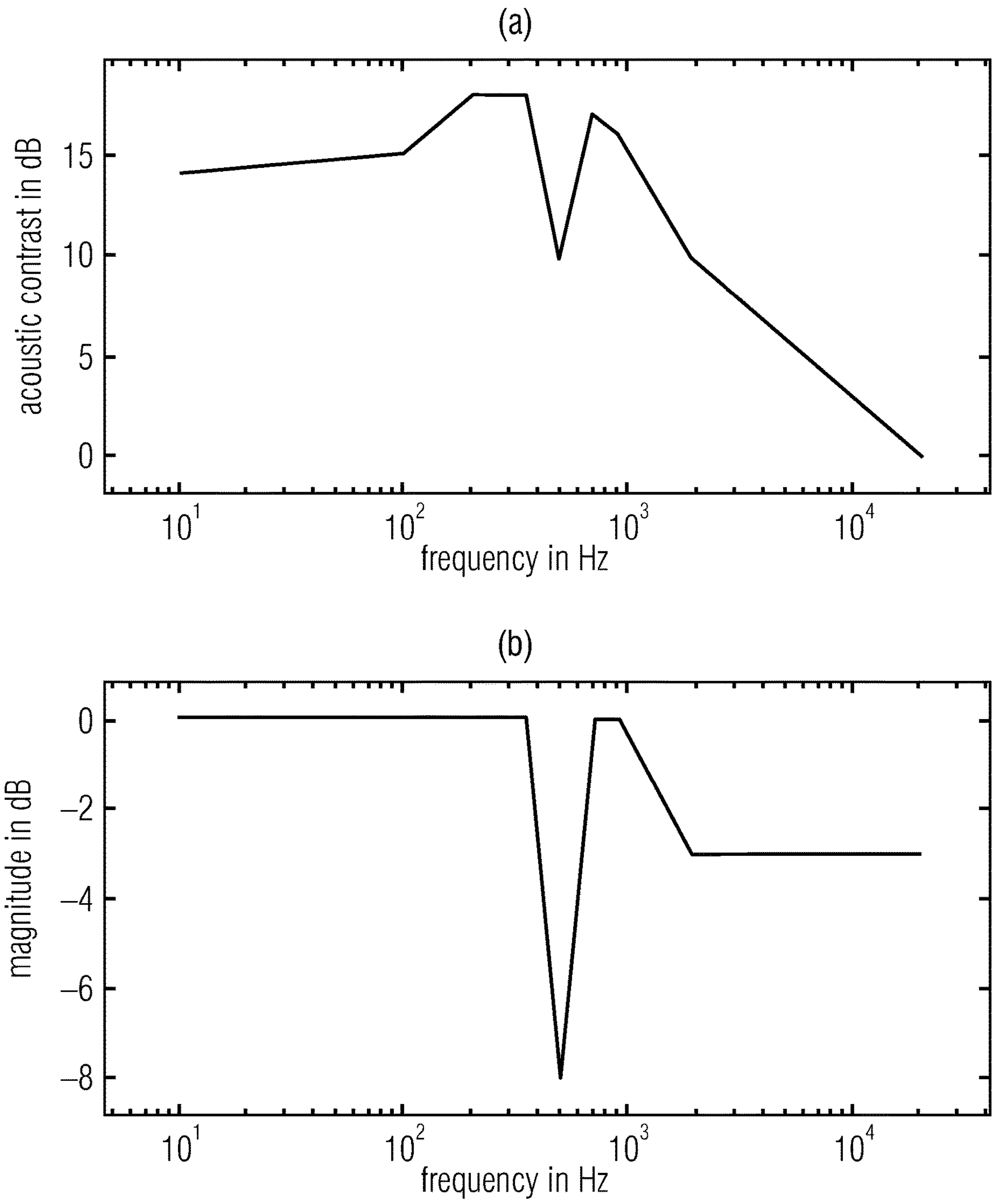
FIG. 10 illustrates an exemplary design of the spectral shapers according to embodiments, wherein (a) illustrates acoustic contrast achieved by a specific reproduction method, and wherein (b) illustrates a chosen magnitude response of the spectral shaping filter.

An example of the corresponding filter response is shown in FIG. 10. In particular, FIG. 10 illustrates an exemplary design of the spectral shapers according to embodiments, wherein (a) illustrates acoustic contrast achieved by a specific reproduction method, and wherein (b) illustrates a chosen magnitude response of the spectral shaping filter.

As outlined above, the filter 140 is configured to generate the plurality of loudspeaker signals depending on in which of the two or more sound zones the two or more audio source signals shall be reproduced and depending on in which of the two or more sound zones the two or more audio source signals shall not be reproduced.

In the following, a filter 140, e.g., prefilter according to embodiments is described.

In an embodiment, for example, one or more audio source signals shall be reproduced in a first sound zone, but not in a second sound zone and at least one further audio source signal shall be reproduced in the second sound zone but not in the first sound zone.

Figure 2:
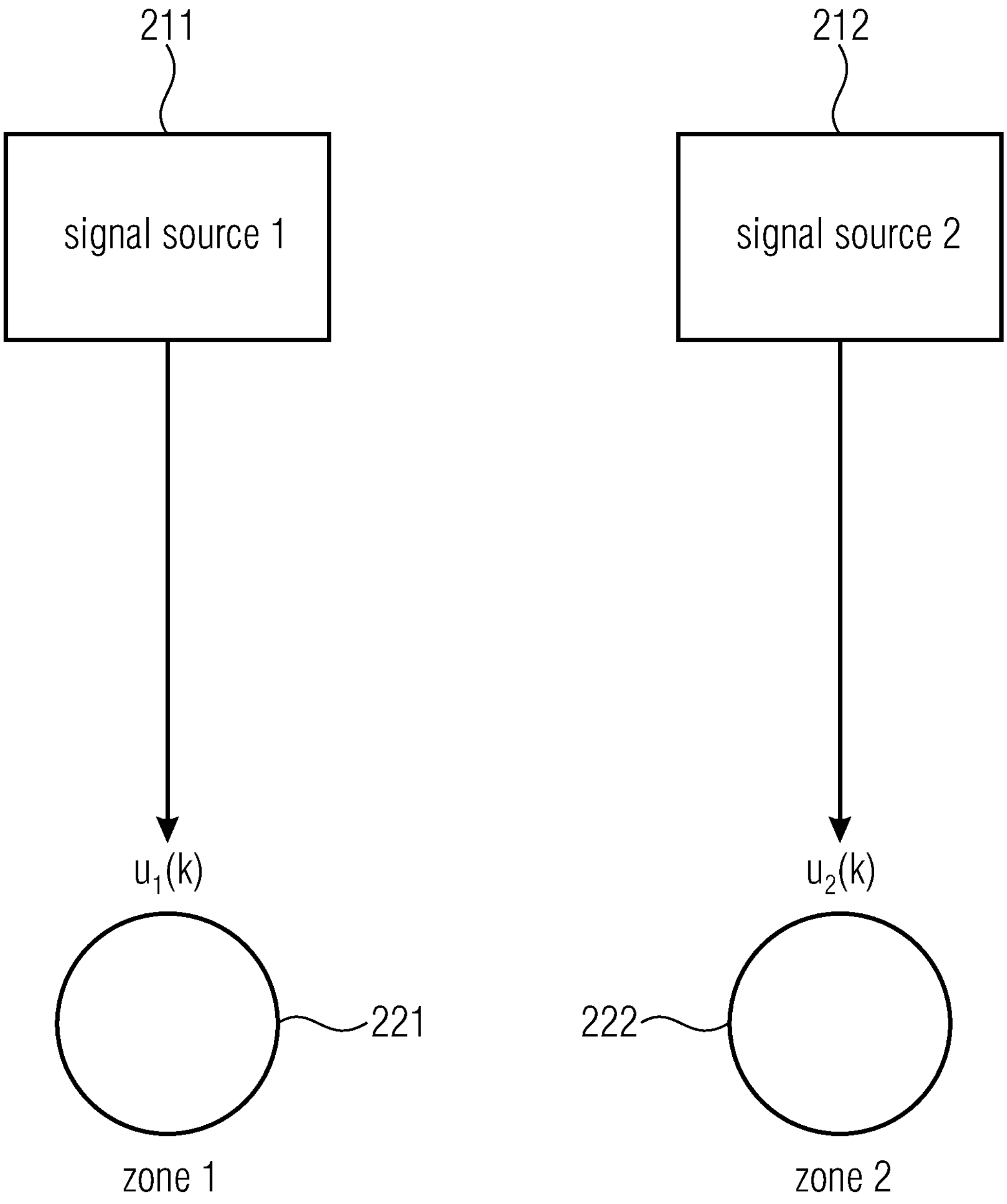
FIG. 2 illustrates ideal multizone reproduction.
Figure 3:
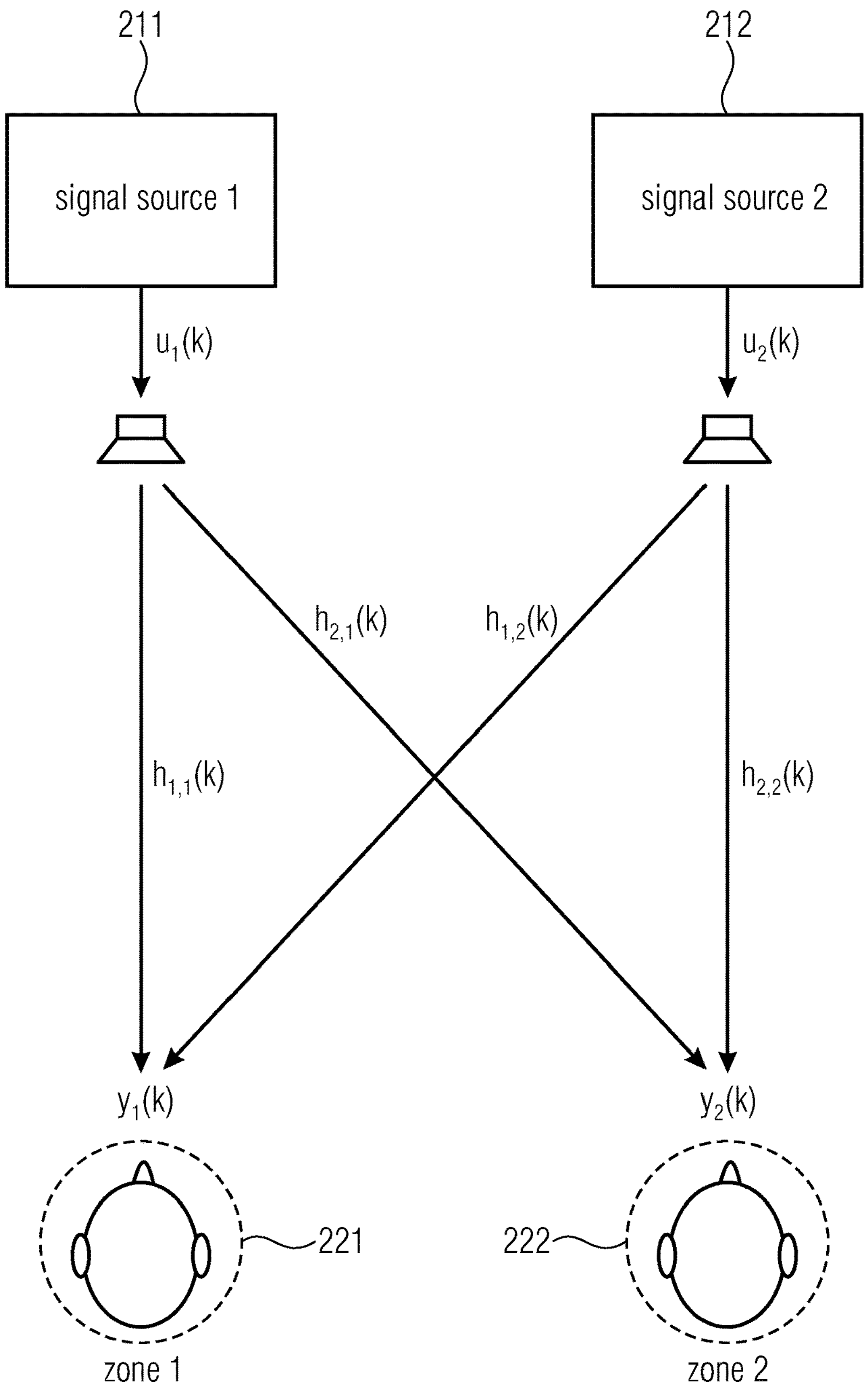
FIG. 3 illustrates a reproduction of multiple signals in reality.
Figure 4:
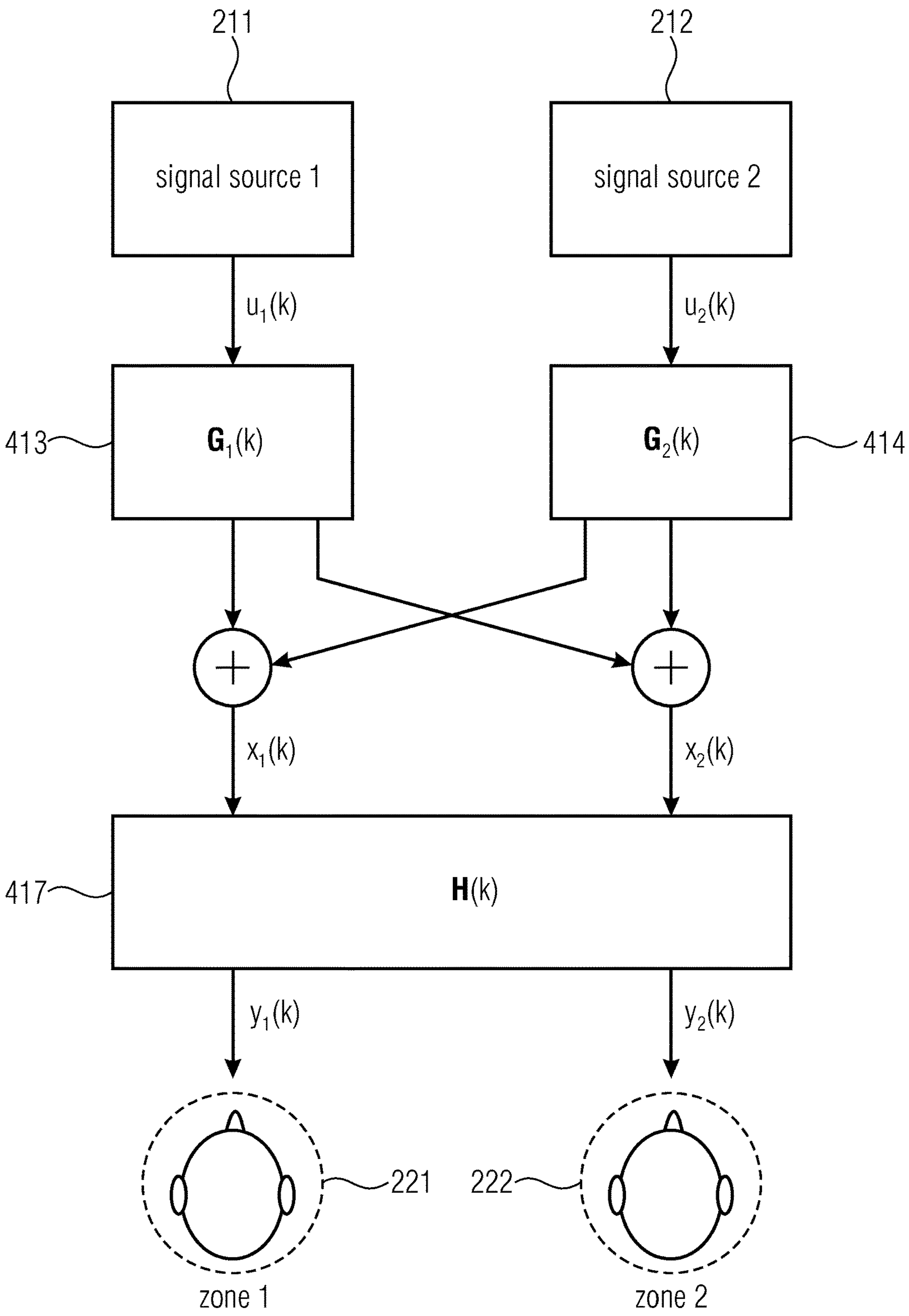
FIG. 4 illustrates a minimal example of multizone reproduction with arrays.

See, for example, FIG. 2 and FIG. 3, where a first audio source signal signals $u_1(k)$ shall be reproduced in sound zone 1, but not in sound zone 2, and where a second audio source signal $u_2(k)$ shall be reproduced in sound zone 2, but not in sound zone 1.

As each of the two or more preprocessed audio signals $h_1(k)$, $h_2(k)$ has been generated based on one of the two or more audio source signals $u_1(k)$, $u_2(k)$, it follows that in such an embodiment, one or more preprocessed audio signals $h_1(k)$ shall be reproduced in the sound zone 1, but not in the sound zone 2 (namely these one or more preprocessed audio signals $h_1(k)$ that have been generated by modifying the one or more sound source signals $u_1(k)$ that shall be reproduced in the sound zone 1, but not in the sound zone 2). Moreover, it follows that least one further preprocessed audio signal $h_2(k)$ shall be reproduced in the sound zone 2, but not in the sound zone 1 (namely those one or more preprocessed audio signals $h_2(k)$ that have been generated by modifying the one or more sound source signals $u_2(k)$ that shall be reproduced in the sound zone 2, but not in the sound zone 1).

Suitable means may be employed that achieve that an audio source signal is reproduced in a first sound zone but not in a second sound zone, or that at least achieve that the audio source signal is reproduced in the first sound zone with a greater loudness than in the second sound zone (and/or or that at least achieve that the audio source signal is reproduced in the first sound zone with a greater signal energy than in the second sound zone).

For example, a filter 140 may be employed, and the filter coefficients may, e.g., be chosen such that a first audio source signal that shall be reproduced in the first sound zone, but not in the second sound zone is reproduced in the first sound zone with a greater loudness (and/or with a greater signal energy) than in the second sound zone. Moreover, the filter coefficients may, e.g., be chosen such that a second audio source signal that shall be reproduced in the second sound zone, but not in the first sound zone is reproduced in the second sound zone with a greater loudness (and/or with a greater signal energy) than in the first sound zone.

For example, an FIR filter (finite impulse response filter) may, e.g., be employed and the filter coefficients may, e.g., be suitably chosen, for example, as described below.

Or, Wave Field Synthesis (WFS), well-known in the art of audio processing may, e.g., be employed (for general information on Wave Field Synthesis, see, for example, as one of many examples [69]).

Or, Higher-Order Ambisonics, well-known in the art of audio processing, may e.g., be employed (for general information on Higher-Order Ambisonics, see, for example, as one of many examples [70]).

Now, a filter 140 according to some particular embodiments, is described in more detail.

In particular, an implementation of the block denoted by $G_1(k)$ and $G_2(k)$ shown in FIG. 7 is presented. A prefilter may, e.g., be associated with an array of loudspeakers. A set of multiple loudspeakers is considered as a loudspeaker array, whenever a prefilter feeds at least one input signal to multiple loudspeakers that are primarily excited in the same frequency range. It is possible that an individual loudspeaker is part of multiple arrays and that multiple input signals are fed to one array, which are then radiated towards different directions.

There are different well-known methods to determine linear prefilters such that an array of non-directional loudspeakers will exhibit a directional radiation pattern, see, e.g., [1], [3], [4], [5] and [6].

Some embodiments realize a pressure matching approach based on measured impulse responses. Some of those embodiments, which employ such an approach, are described in the following, where only a single loudspeaker array is considered. Other embodiments use multiple loudspeaker arrays. The application to multiple loudspeaker arrays is straightforward.

For the description of these embodiments, a notation is used that is more suitable to obtain FIR filters compared to the notation above, which would also cover HR filters. To this end, the filter coefficients $g_{l,q}(k)$ are captured in the vectors $$g_q=(g_{q,1}(0), \ldots, g_{q,1}(L_G-1), g_{q,2}(0), \ldots, g_{q,2}(L_G-1), g_{q,N_L}(0), \ldots, g_{q,N_L}(L_G-1))^T \quad (26)$$

For the optimization, the convolved impulse response of the prefilters and the room impulse response (RIR) may be considered, which is given by $$z_m(k) = \sum_{l=1}^{N_L} \sum_{n=0}^{L_G-1} h_{m,l}(n) g_l(k-n), \quad (27)$$

where $g_l(k)$ and $h_{m,l}(k)$ are assumed to be zero for $k<0$ and $k \geq L_G$ or $k \geq L_H$, respectively.

As a result, the overall impulse responses $z_m(k)$ have a length of $L_G+L_H-1$ samples and can be captured by the vector $$z=(z_1(0),z_1(1), \ldots ,z_1(L_G+L_H-2),z_2(0),z_2(1), \ldots ,z_2(L_G+L_H-2),z_{N_M}(0),z_{N_M}(1), \ldots ,z_{N_M}(L_G+L_H-2))^T. \quad (28)$$

Now, it is possible to define the convolution matrix H, such that $$\hat{z}=Hg \quad (29)$$

describes the same convolution as Equation (27) does. For the optimization, the desired impulse $d_{m,q}(k)$ can be defined according to needs of the application.

A way to define $d_{m,q}(k)$ is to consider each loudspeaker as potential source to be reproduced with its original sound field in the bright zone but no radiation to the dark zone. This is described by $$d_{m,q}(k) = \begin{cases} h_{m,q}(k-\Delta k) & \text{if } h_{m,q}(k) \text{ belongs to } B_q(k), \\ 0 & \text{if } h_{m,q}(k) \text{ belongs to } D_q(k) \end{cases}, \quad (30)$$

where the delay $\Delta k$ is used to ensure causality. A perfect reproduction is described by $$d_q=Hg_q \quad (31)$$

but will typically not be possible due to physical constraints. It should be noted that this definition is just one among many, which has some practical merit due to its simplicity, while other definitions may be more suitable, depending on the application scenario.

Now, the least-squares reproduction error can be defined as:

$$E_q = (\hat{z}-d_q)^H W_q^H W_q(\hat{z}-d_q), \quad (32)$$

$$= (g^H H^H - d_q^H) W_q^H W_q(Hg-d_q), \quad (33)$$

where $W_q$ is a matrix that can be chosen such that a frequency-dependent weighting and/or a position-dependent weighting is achieved.

When deriving $B_q$ and $D_q$ from $B_q(k)$ and $D_q(k)$, respectively, in the same way as H was derived from 11(k). Equation (14) can be represented by $$C_q = \frac{g_q^H B_q^H B_q g_q}{g_q^H D_q^H D_q g_q}. \quad (34)$$

It should be noted that maximizing Equation (34) can be solved as a generalized eigenvalue problem [3].

The error $E_q$ can be minimized by determining the complex gradient of Equation (33) and setting it to zero [7]. The complex gradient of Equation (33) is given by $$\frac{E_q}{\partial g_q^H} = H^H W_q^H W_q H g_q - H^H W_q^H W_q d_q. \quad (35)$$

Resulting in $$g_q=(H^H W_q^H W_q H)^{-1} H^H W_q^H W_q d_q \quad (36)$$

as the least-squares optimal solution.

Although, many algorithms are formulated for non-weighted least squares, they can be used to implement weighted least squares by simply replacing H and $d_q$ with $W_q H$ and $W_q d_q$, respectively.

The weighting matrix $W_q$ is in general a convolution matrix similar to H defined by (26) to (29).

The matrix H consist of several submatrices $H_{m,l}$:

$$H = \begin{pmatrix} H_{1,1} & H_{1,2} & \ldots & H_{1,N_L} \\ H_{2,1} & H_{2,2} & \ldots & H_{2,N_L} \\ \vdots & \vdots & \ddots & \vdots \\ H_{1,1} & H_{1,2} & \ldots & H_{1,N_L} \end{pmatrix} \quad (36a)$$

An example for $H_{m,l}$ can be given assuming $$h_{1,1}(0)=5 \quad (36b)$$
$$h_{1,1}(1)=4$$
$$h_{1,1}(2)=3$$
$$h_{1,1}(3)=2$$
$$h_{1,1}(4)=1$$

where $$H_{1,1} = \begin{pmatrix} 5 & 0 & 0 & 0 \\ 4 & 5 & 0 & 0 \\ 3 & 4 & 5 & 0 \\ 2 & 3 & 4 & 5 \\ 1 & 2 & 3 & 4 \\ 0 & 1 & 2 & 3 \\ 0 & 0 & 1 & 2 \\ 0 & 0 & 0 & 1 \end{pmatrix} \quad (36c)$$

From that scheme it is clear to the expert how (27) and (29) define the structure of H.

To facilitate a frequency-dependent and microphone-dependent weighting through $W_q$, the impulse responses $w_{m,q}(k)$ according to the well-known filter design methods. Here, $w_{m,q}(k)$ defines the weight for source q and microphone m. Unlike H, $W_q$ is a block-diagonal matrix:

$$W_q = \begin{pmatrix} W_{1,q} & 0 & \ldots & 0 \\ 0 & W_{2,q} & \ldots & 0 \\ \vdots & \vdots & \ddots & \vdots \\ 0 & 0 & \ldots & W_{N_M,q} \end{pmatrix} \quad (36d)$$

where $W_{m,q}$ is structured like $H_{m,l}$.

Regarding the computation of the filter coefficients, noting that (36) gives the filter coefficients explicitly, its computation is very demanding in practice. Due to the similarity of this problem to the problem solved for listening room equalization, the methods used there can also be applied.

Hence, a very efficient algorithm to compute (36) is described in [71]: SCHNEIDER, Martin; KELLERMANN, Walter. Iterative DFT-domain inverse filter determination for adaptive listening room equalization. In: Acoustic Signal Enhancement; Proceedings of IWAENC 2012; International Workshop on. VDE, 2012, S. 1-4.

Figure 11:
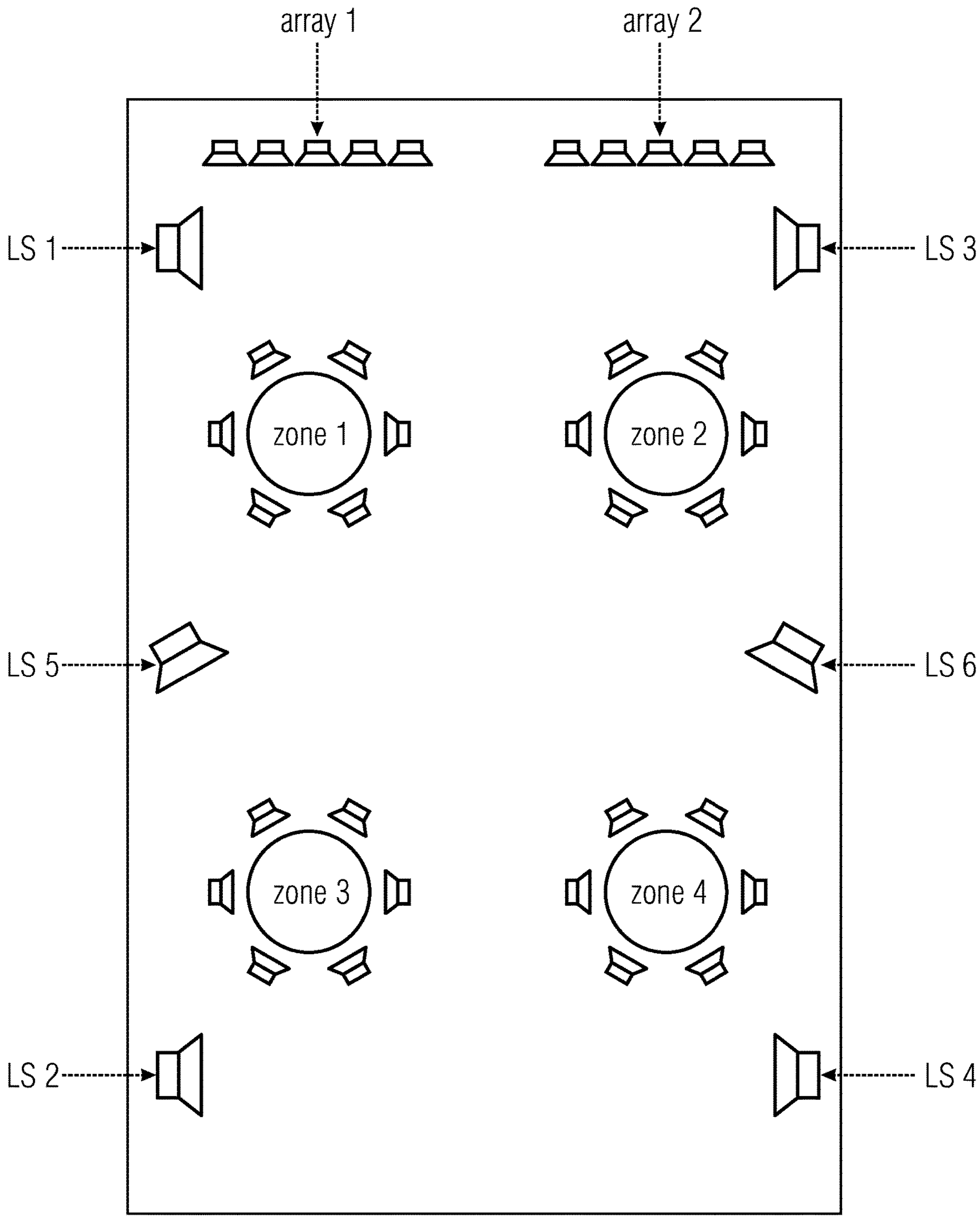
FIG. 11 illustrates an exemplary loudspeaker setup in an enclosure according to an embodiment.

In the following, a loudspeaker-enclosure-microphone system (LEMS) according to embodiments is described. In particular, the design of an LEMS according to embodiments is discussed. In some embodiments, the measures described above may, e.g., rely on the distinct properties of the LEMS FIG. 11 illustrates an exemplary loudspeaker setup in an enclosure according to an embodiment. In particular, FIG. 11 illustrates an exemplary LEMS with four sound zones is shown. An individual acoustic scene should be replayed in each of those sound zones. To this end, the loudspeakers shown in FIG. 11 are used in specific ways, depending on their position relative to each other and relative to the sound zones.

The two loudspeaker arrays denoted by “Array 1” and “Array 2” are used in conjunction with accordingly determined prefilters (see above). In this way, it is possible to electrically steer the radiation of those arrays towards “Zone 1” and “Zone 2”. Assuming that both arrays exhibit an inter-loudspeaker distance of a few centimeters while the arrays exhibit an aperture size of a few decimeters, effective steering is possible for midrange frequencies.

Although it is not obvious, the omni-directional loudspeakers “LS 1”, “LS 2”, “LS 3”, and “LS 4”, which may, e.g., be located 1 to 3 meters distant to each other can also be driven as a loudspeaker array when considering frequencies below, e.g., 300 Hz. According prefilters can be determined using the method described above.

The loudspeakers “LS 5” and “LS 6” are directional loudspeakers that provide high-frequency audio to Zones 3 and 4, respectively.

As described above, measures for directional reproduction may sometimes not lead to sufficient results for the whole audible frequency range. To compensate for this issue, there may, for example, be loudspeakers located in the close vicinity or within the respective sound zones. Although this positioning is suboptimal with respect to the perceived sound quality, the difference in distance of the loudspeakers to the zone assigned compared to the distance to the other zones allows for a spatially focused reproduction, independent of frequency. Thus, these loudspeakers may, e.g., be used in frequency ranges where the other methods do not lead to satisfying results.

In the following, further aspects according to some of the embodiments are described:

In some of the embodiments, the “Preprocessing” block is placed after the “Band splitter” blocks or after the “Spectral shaper” blocks. In that case, one preprocessing block may, e.g., be implemented for each of the “splitted” frequencies bands. In the example shown in FIG. 7 one “Preprocessing” block would consider $w_1(k)$ and $w_4(k)$ and another $w_2(k)$ and $w_3(k)$. Still, one aspect of the preprocessing has still to be placed at the old position, as described above, where preprocessing is described.

Since the acoustic leakage depends on the reproduction method which is chosen differently for each frequency band, such an implementation has the advantage that the preprocessing parameters can be matched to the demands of the reproduction method. Moreover, when choosing such an implementation, compensating for the leakage in one frequency band will not affect another frequency band. Since the “Preprocessing” block is not an LTI system this exchange implies a change in the functionality of the overall system, even though the resulting system will still reliably solve the same problem.

Additionally, it should be noted that some of the embodiments may use a measuring of the impulse responses from all loudspeakers to multiple microphones prior to operation. Hence, no microphones may be used during operation.

The proposed method is generally suitable for any multizone reproduction scenario, for example, in-car scenarios.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, one or more of the most important method steps may be executed by such an apparatus.

Depending on certain implementation requirements, embodiments of the invention can be implemented in hardware or in software or at least partially in hardware or at least partially in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitory.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are performed by any hardware apparatus.

The apparatus described herein may be implemented using a hardware apparatus, or using a computer, or using a combination of a hardware apparatus and a computer.

The methods described herein may be performed using a hardware apparatus, or using a computer, or using a combination of a hardware apparatus and a computer.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

REFERENCES

[1] W. Druyvesteyn and J. Garas, "Personal sound," *Journal of the Audio Engineering Society*, vol, 45, no, 9, pp. 685-701, 1997.
[2] F. Dowla and λ Spiridon, "Spotforming with an array of ultra-wideband radio transmitters," in *Ultra Wideband Systems and Technologies,* 2003 *IEEE Conference on*, November 2003, pp. 172-175.
[3] J. W. Choi and Y. H. Kim, "Generation of an acoustically bright zone with an illuminated region using multiple sources," *Journal of the Acoustical Society of America, vol.* 111, no. 4, pp. 1695-1700, 2002.
[4] M. Poletti, "An investigation of 2-d multizone surround sound systems," in *Audio Engineering Society Convention* 125, October 2008. [Online]. Available: http://www.aes.org/e-liblbrowse.cfm?elib=14703
[5] Y. Wu and T. Abhayapala, "Spatial multizone soundfield reproduction," in *Acoustics, Speech and Signal Processing,* 2009. *ICASSP* 2009. *IEEE International Conference on*, April 2009, pp. 93-96.
[6] Y. J. Wu and T. D. Abhayapala, "Spatial multizone soundfield reproduction: Theory and design," *Audio, Speech, and Language Processing, IEEE Transactions on*, vol. 19, no. 6, pp. 1711-1720, 2011.
[7] D. Brandwood, "A complex gradient operator and its application in adaptive array theory," *Microwaves, Optics and Antennas, IEE Proceedings H*, vol. 130, no. 1, pp, 11-16, February 1983.
[8] US 2005/0152562 A1.
[9] US 2013/170668 A1,
[10] US 2008/0071400 A1,
[11] US 2006/0034470 A1
[12] US 2011/0222695 A1
[13] US 2009/0232320 A1
[14] US 2015/0256933 A1.
[15] U.S. Pat. No. 6,674,865 B1,
[16] DE 30 45 722 A1.
[17] US 2012/0140945 A1.
[18] US 2008/0273713 A1.
[19] US 2004/0105550 A1,
[20] US 2006/0262935 A1,
[21] US 2005/0190935 A1.
[22] US 2008/0130922 A1
[23] US 2010/0329488 A1
[24] DE 10 2014 210 105 A1,
[25] US 2011/0286614 A1,
[26] US 2007/0053532 A1.
[27] US 2013/0230175 A1.
[28] WO 2016/008621 A1,
[29] US 2008/0273712 A1.
[30] U.S. Pat. No. 5,870,484.
[31] U.S. Pat. No. 5,309,153.
[32] US 2006/0034467 A1.
[33] US 2003/0103636 A1.
[34] US 2003/0142842 A1.
[35] JP 5345549,
[36] US2014/0056431 A1
[37] US 2014/0064526 A1.
[38] US 2005/0069148 A1,
[39] U.S. Pat. No. 5,081,682,
[40] DE 90 15 454.
[41] U.S. Pat. No. 5,550,922,
[42] U.S. Pat. No. 5,434,922,
[43] U.S. Pat. No. 6,073,670.
[44] U.S. Pat. No. 6,674,865 B
[45] DE 100 52 104 A1,
[46] US 2005/0135635 A1
[47] DE102 42 558 A1.
[48] US 2010/0046765 A1.
[49] DE 10 2010 040 639
[50] US 2008/0103615 A1.
[51] U.S. Pat. No. 8,190,438 B1.
[52] WO 2007/098916 A1.
[53] US 2007/0274546 A1,
[54] US 2007/0286426 A1.
[55] U.S. Pat. No. 5,013,205.
[56] U.S. Pat. No. 4,944,018.
[57] DE 103 51 145 A1,
[58] JP 2003-255954.
[59] U.S. Pat. No. 4,977,600,
[60] U.S. Pat. No. 5,416,846.
[61] US 2007/0030976 A1,
[62] JP 2004-363696,
[63] Wikipedia: "Angular resolution", https://en.wikipedia.org/wiki/Angular_resolution retrieved from the Internet on 8 Apr. 2016.
[64] Wikipedia: "Nyquist-Shannon_sampling_theorem", https://en.wikipedia.org/wiki/Nyquist-Shanhon_sampling_theorem retrieved from the Internet on 8 Apr. 2016.
[65] Wikipedia: "Dynamic range compression", https://en.wikipedia.org/wiki/Dynamic_range_compression, retrieved from the Internet on 8 Apr. 2016.
[66] Wikipedia: "Weighting filter", https://en.wikipedia.org/wiki/Weighting_filter, retrieved from the Internet on 8 Apr. 2016.
[67] Wikipedia; "Audio crossover—Digital", https://en.wikipedia.org/wiki/Audio_crossover#Digital, retrieved from the Internet on 8 Apr. 2016.
[68] Wikipedia: "Equalization (audio)—Filter functions", https://en.wikipedia.org/wiki/Equalization_(audio)#Filter Junctions, retrieved from the Internet on 8 Apr. 2016.

[69] WO 2004/114725 A1,
[70] EP 2 450 880 A1.
[71] SCHNEIDER, Martin; KELLERMANN, Walter: "Iterative IDT-domain inverse filter determination for adaptive listening room equalization." In: Acoustic Signal Enhancement; Proceedings of IWAENC 2012; International Workshop on. VDE, 2012, S. 1-4.

The invention claimed is:

1. An apparatus for generating a plurality of loudspeaker signals from two or more audio source signals, wherein each of the two or more audio source signals shall be reproduced in one or more sound zones of at least two sound zones, and wherein each of the two or more audio source signals shall not be reproduced in any other sound zone of the at least two sound zones, wherein the apparatus comprises:

an audio preprocessor configured to generate two or more preprocessed audio signals by modifying each of two or more initial audio signals, wherein the two or more initial audio signals are two or more audio source signals, or wherein the two or more initial audio signals are derived from the two or more audio source signals, and a filter configured to generate the plurality of loudspeaker signals depending on the two or more preprocessed audio signals, and depending on in which of the at least two sound zones the two or more audio source signals shall be reproduced, wherein the audio preprocessor is configured to modify each initial audio signal of the two or more initial audio signals depending on a signal power or a loudness of another initial audio signal of the two or more initial audio signals;

wherein the filter is configured to generate the plurality of loudspeaker signals depending on in which of the at least two sound zones the two or more audio source signals shall not be reproduced, wherein for each audio source signal of the two or more audio source signals, said audio source signal is to be reproduced in the one or more sound zones of the at least two sound zones, such that said audio source signal is to not be reproduced in at least another sound zone of the at least two sound zones;

wherein the audio preprocessor is configured to modify an initial audio signal of the two or more initial audio signals by determining a gain $g'_1(k)$ for said initial audio signal and by applying the gain $g'_1(k)$ on said initial audio signal, wherein the audio preprocessor is configured to determine the gain $g'_1(k)$ according to $$g'_1(k) = \begin{cases} 10^{(T_1+v_1)(R-1)/(20R)} & \text{for } T_1 + v_1 < 0 \\ 1 & \text{otherwise} \end{cases},$$

or according to $$g'_1(k) = \begin{cases} 10^{(T_2+v_1)(R-1)/(20R)} & \text{for } T_2 + v_1 > 0 \\ 1 & \text{otherwise} \end{cases},$$

with $$v_1 = -10\log_{10}(e_1(k)) + 10\log_{10}\left(\sum_{i=2}^{N} e_i(i)\right)$$

wherein k is a time index, wherein $T_1$ indicates a first threshold value and $T_2$ indicates a second threshold value, wherein $e_1(k)$ indicates a signal power or a loudness of said initial audio signal, wherein N indicates a number of the two or more initial audio signals, wherein $e_i(k)$ indicates a signal power or a loudness of a further initial audio signal of the two or more initial audio signals, and wherein R indicates a number, with $1 \le R \le 100$; or wherein the audio preprocessor is configured to modify each initial audio signal of the two or more initial audio signals depending on the signal power or the loudness of another initial audio signal of the two or more initial audio signals by determining a gain $g'_1(k)$ for said initial audio signal and by applying the gain $g'_1(k)$ on said initial audio signal, wherein the audio preprocessor is configured to determine the gain $g'_1(k)$ according to $$g'_1(k) = \begin{cases} 10^{(T_1+v)(R-1)/(20R)} & \text{for } T_1 + v < 0 \\ 1 & \text{otherwise} \end{cases},$$

or according to $$g'_1(k) = \begin{cases} 10^{(T_2+v)(R-1)/(20R)} & \text{for } T_2 + v > 0 \\ 1 & \text{otherwise} \end{cases},$$

with $$v = -10\log_{10}(e_1(k)) + 10\log_{10}(e_2(k))$$

wherein k is a time index, wherein $T_1$ indicates a first threshold value and $T_2$ indicates a second threshold value, wherein $e_1(k)$ indicates a signal power or a loudness of said initial audio signal, wherein $e_2(k)$ indicates a signal power or a loudness of said another initial audio signal of the two or more initial audio signals, and wherein R indicates a number, with $1 \le R \le 100$.

2. The apparatus according to claim 1, wherein the audio preprocessor is configured to modify each initial audio signal of the two or more initial audio signals depending on the signal power or the loudness of another initial audio signal of the two or more initial audio signals by modifying said initial audio signal of the two or more initial audio signals depending on a ratio of a first value to a second value, wherein the second value depends on the signal power of said initial audio signal, and the first value depends on the signal power of said another initial audio signal of the two or more initial audio signals, or wherein the second value depends on the loudness of said initial audio signal, and the first value depends on the loudness of said another initial audio signal of the two or more initial audio signals.

3. The apparatus according to claim 1, wherein the audio preprocessor is configured to modify each initial audio signal of the two or more initial audio signals depending on the signal power or the loudness of another initial audio signal of the two or more initial audio signals by determining a gain for said initial audio signal and by applying the gain on said initial audio signal, wherein the audio preprocessor is configured to determine the gain depending on the ratio between a first value and a second value, said ratio being a ratio between the signal power of said another initial audio signal of the two or more initial audio signals as the first value and the signal power of said initial audio signal as the second value, or said ratio being a ratio between the loudness of said another initial audio signal of the two or more initial audio signals as the first value and the loudness of said initial audio signal as the second value.

4. The apparatus according to claim 3, wherein the audio preprocessor is configured to determine the gain depending on a function that monotonically increases with the ratio between the first value and the second value.

5. The apparatus according to claim 1, wherein the audio preprocessor is configured to modify each initial audio signal of the two or more initial audio signals according to $$e_1(k)=\lambda_2 e_1(k-1)+(1-\lambda_2)\Sigma_{l=1}{}^{L} d_1{}^2(k,l),$$

or according to $$e_1(k) = \frac{1}{K}\sum_{n=0}^{K-1}\sum_{l=1}^{L} d_1^2(k-n, l),$$

or according to $$e_1(k) = \max_{n=0,1,\ldots,K-1,\, l=1,2,\ldots,L} d_1^2(k-n, l).$$

wherein $e_1(k)$ indicates a signal power of said initial audio signal, wherein k indicates a time index, wherein $\lambda_2$ is a value in the range $0<\lambda_2<1$, wherein L is a number of audio channels of the initial audio signal, wherein $L\geq 1$, wherein $d_1{}^2$ indicates a signal resulting from squaring said initial audio signal, wherein K indicates a number of samples of a window.

6. The apparatus according to claim 1, wherein the audio preprocessor is configured to generate the two more initial audio signals by normalizing a power of each of the two or more audio source signals.

7. The apparatus according to claim 6, wherein the audio preprocessor is configured to generate each initial audio signal of the two more initial audio signals by normalizing a power of each audio source signal of the two or more audio source signals according to $$d_1(k,l)=c_1(k)u_1(k,l), \text{ and according to}$$

$$c_1(k) = \frac{1}{\sqrt{b_1(k)}},$$

wherein k is a time index, wherein l indicates one of one or more audio channels of said audio source signal, wherein $d_1$ indicates said initial audio signal, wherein $u_1$ indicates said audio source signal, wherein $b_1$ indicates an average of a power of said audio source signal $u_1$.

8. The apparatus according to claim 7, wherein the audio preprocessor is configured to determine the average $b_1$ of the power of said audio source signal $u_1$ according to $$b_1(k)=\lambda_1 b_1(k-1)+(1-\lambda_1)\Sigma_{l=1}{}^{L} u_1{}^2(k,l),$$

where $0<\lambda_1<1$.

9. The apparatus according to claim 1, wherein the filter (140) is configured to generate the plurality of loudspeaker signals depending on in which of the at least two sound zones the two or more audio source signals shall be reproduced and depending on in which of the at least two sound zones the two or more audio source signals shall not be reproduced, by determining filter coefficients of an FIR filter.

10. The apparatus according to claim 9, wherein the filter is configured to generate the plurality of loudspeaker signals depending on in which of the at least two sound zones the two or more audio source signals shall be reproduced and depending on in which of the at least two sound zones the two or more audio source signals shall not be reproduced by determining the filter coefficients of the FIR filter according to the formula $$g_q=(H^H W_q{}^H W_q H)^{-1} H^H W_q{}^H W_q d_q$$

wherein $g_q$ is a vector comprising the filter coefficients of the FIR filter according to $$g_q=(g_{q,1}(0), \ldots, g_{q,1}(L_G-1), g_{q,2}(0), \ldots, g_{q,2}(L_G-1), \ldots, g_{q,N_L}(0), \ldots, g_{q,N_L}(L_G-1))^T$$

wherein H is a convolution matrix depending on a room impulse response, wherein W is a weighting matrix, wherein $d_q$ indicates desired impulse responses, wherein $g_{q,i}$ indicates one of the filter coefficients with $1<i<N_L$, wherein $N_L$ indicates a number of loudspeakers, and wherein $L_G$ indicates a length of the FIR filter.

11. The apparatus according to claim 1, wherein the filter is configured to generate the plurality of loudspeaker signals depending on in which of the at least two sound zones the two or more audio source signals shall be reproduced and depending on in which of the at least two sound zones the two or more audio source signals shall not be reproduced, by conducting Wave Field Synthesis.

12. The apparatus according to claim 1, wherein the apparatus further comprises two or more band splitters being configured to conduct band splitting on the two or more preprocessed audio signals to a plurality of band-splitted audio signals, wherein the filter is configured to generate the plurality of loudspeaker signals depending on the plurality of band-splitted audio signals.

13. The apparatus according to claim 12, wherein the apparatus further comprises one or more spectral shapers being configured to modify a spectral envelope of one or more of the plurality of band-splitted audio signals to acquire one or more spectrally shaped audio signals, wherein the filter is configured to generate the plurality of loudspeaker signals depending on the one or more spectrally shaped audio signals.

14. A method for generating a plurality of loudspeaker signals from two or more audio source signals, wherein modifying each initial audio signal of two or more initial audio signals is conducted depending on a signal power or a loudness of another initial audio signal of the two or more initial audio signals; wherein each of the two or more audio source signals shall be reproduced in one or more sound zones of at least two sound zones, and wherein each of the two or more audio source signals shall not be reproduced in any other sound zone of the at least two sound zones, wherein the method comprises:

generating two or more preprocessed audio signals by modifying each of the two or more initial audio signals, wherein the two or more initial audio signals are two or more audio source signals, or wherein the two or more initial audio signals are derived from the two or more audio source signals; and generating the plurality of loudspeaker signals depending on the two or more preprocessed audio signals, and depending on in which of the at least two sound zones the two or more audio source signals shall be reproduced;

wherein generating the plurality of loudspeaker signals is conducted depending on in which of the at least two sound zones the two or more audio source signals shall not be reproduced;

wherein for each audio source signal of the two or more audio source signals, said audio source signal is to be reproduced in the one or more sound zones of the at least two sound zones, such that said audio source signal is to not be reproduced in at least another sound zone of the at least two sound zones;

wherein modifying an initial audio signal of the two or more initial audio signals is conducted by determining a gain g'$_1$(k) for said initial audio signal and by applying the gain g'$_1$(k) on said initial audio signal, wherein determining the gain g'$_1$(k) is conducted according to $$g_1'(k) = \begin{cases} 10^{(T_1+v_1)(R-1)/(20R)} & \text{for } T_1 + v_1 < 0 \\ 1 & \text{otherwise,} \end{cases}$$

or according to $$g_1'(k) = \begin{cases} 10^{(T_2+v_1)(R-1)/(20R)} & \text{for } T_2 + v_1 > 0 \\ 1 & \text{otherwise,} \end{cases}$$

with $$v_1 = -10\log_{10}(e_1(k)) + 10\log_{10}\left(\sum_{i=2}^{N} e_i(k)\right)$$

wherein k is a time index, wherein $T_1$ indicates a first threshold value and $T_2$ indicates a second threshold value, wherein $e_1$(k) indicates a signal power or a loudness of said initial audio signal, wherein N indicates a number of the two or more initial audio signals, wherein $e_i$(k) indicates a signal power or a loudness of a further initial audio signal of the two or more initial audio signals, and wherein R indicates a number, with 1≤R≤100; or wherein modifying each initial audio signal of the two or more initial audio signals is conducted depending on the signal power or the loudness of another initial audio signal of the two or more initial audio signals by determining a gain g'$_1$(k) for said initial audio signal and by applying the gain g'$_1$(k) on said initial audio signal, wherein determining the gain g'$_1$(k) is conducted according to $$g_1'(k) = \begin{cases} 10^{(T_1+v)(R-1)/(20R)} & \text{for } T_1 + v < 0 \\ 1 & \text{otherwise,} \end{cases}$$

or according to $$g_1'(k) = \begin{cases} 10^{(T_2+v)(R-1)/(20R)} & \text{for } T_2 + v > 0 \\ 1 & \text{otherwise,} \end{cases}$$

with $$v = -10\log_{10}(e_1(k)) + 10\log_{10}(e_2(k))$$

wherein k is a time index, wherein $T_1$ indicates a first threshold value and $T_2$ indicates a second threshold value, wherein $e_1$(k) indicates a signal power or a loudness of said initial audio signal, wherein $e_2$(k) indicates a signal power or a loudness of said another initial audio signal of the two or more initial audio signals, and wherein R indicates a number, with 1≤R≤100.

15. A non-transitory digital storage medium having a computer program stored thereon to perform a method for generating a plurality of loudspeaker signals from two or more audio source signals, wherein each of the two or more audio source signals shall be reproduced in one or more sound zones of at least two sound zones, and wherein each of the two or more audio source signals shall not be reproduced in any other sound zone of the at least two sound zones, wherein the method comprises:

generating two or more preprocessed audio signals by modifying each of two or more initial audio signals, wherein the two or more initial audio signals are two or more audio source signals, or wherein the two or more initial audio signals are derived from the two or more audio source signals; and generating the plurality of loudspeaker signals depending on the two or more preprocessed audio signals, and depending on in which of the at least two sound zones the two or more audio source signals shall be reproduced;

wherein modifying each initial audio signal of the two or more initial audio signals is conducted depending on a signal power or a loudness of another initial audio signal of the two or more initial audio signals;

wherein generating the plurality of loudspeaker signals is conducted depending on in which of the at least two sound zones the two or more audio source signals shall not be reproduced;

when said computer program is run by a computer;

wherein for each audio source signal of the two or more audio source signals, said audio source signal is to be reproduced in the one or more sound zones of the at least two sound zones, such that said audio source signal is to not be reproduced in at least another sound zone of the at least two sound zones;

wherein modifying an initial audio signal of the two or more initial audio signals is conducted by determining a gain g'$_1$(k) for said initial audio signal and by applying the gain g'$_1$(k) on said initial audio signal, wherein determining the gain g'$_1$(k) is conducted according to $$g_1'(k) = \begin{cases} 10^{(T_1+v_1)(R-1)/(20R)} & \text{for } T_1 + v_1 < 0 \\ 1 & \text{otherwise,} \end{cases}$$

or according to $$g_1'(k) = \begin{cases} 10^{(T_2+v_1)(R-1)/(20R)} & \text{for } T_2 + v_1 > 0 \\ 1 & \text{otherwise,} \end{cases}$$

with $$v_1 = -10\log_{10}(e_1(k)) + 10\log_{10}\left(\sum_{i=2}^{N} e_i(k)\right)$$

wherein k is a time index, wherein $T_1$ indicates a first threshold value and $T_2$ indicates a second threshold value, wherein $e_1(k)$ indicates a signal power or a loudness of said initial audio signal, wherein N indicates a number of the two or more initial audio signals, wherein $e_i(k)$ indicates a signal power or a loudness of a further initial audio signal of the two or more initial audio signals, and wherein R indicates a number, with 1≤R≤100; or wherein modifying each initial audio signal of the two or more initial audio signals is conducted depending on the signal power or the loudness of another initial audio signal of the two or more initial audio signals by determining a gain $g'_1(k)$ for said initial audio signal and by applying the gain $g'_1(k)$ on said initial audio signal, wherein determining the gain $g'_1(k)$ is conducted according to $$g_1'(k) = \begin{cases} 10^{(T_1+v)(R-1)/(20R)} & \text{for } T_1 + v < 0 \\ 1 & \text{otherwise,} \end{cases}$$

or according to $$g_1'(k) = \begin{cases} 10^{(T_2+v)(R-1)/(20R)} & \text{for } T_2 + v > 0 \\ 1 & \text{otherwise,} \end{cases}$$

with $$v = -10\log_{10}(e_1(k)) + 10\log_{10}(e_2(k))$$

wherein k is a time index, wherein $T_1$ indicates a first threshold value and $T_2$ indicates a second threshold value, wherein $e_1(k)$ indicates a signal power or a loudness of said initial audio signal, wherein $e_2(k)$ indicates a signal power or a loudness of said another initial audio signal of the two or more initial audio signals, and wherein R indicates a number, with 1≤R≤100.

* * * * *